US008423466B2

(12) United States Patent
Lanc

(10) Patent No.: US 8,423,466 B2
(45) Date of Patent: Apr. 16, 2013

(54) SECURE AUTHENTICATION AND PAYMENT SYSTEM

(75) Inventor: David Lanc, Edinburgh (GB)

(73) Assignee: Payfont Limited, Edinburgh (GB)

( * ) Notice: Subject to any disclaimer, the term of this patent is extended or adjusted under 35 U.S.C. 154(b) by 557 days.

(21) Appl. No.: 11/692,656

(22) Filed: Mar. 28, 2007

(65) Prior Publication Data

US 2008/0103972 A1    May 1, 2008

(30) Foreign Application Priority Data

Oct. 25, 2006  (GB) .................................. 0621189.0

(51) Int. Cl.
*G06Q 40/00*   (2012.01)
(52) U.S. Cl.
USPC .............................................. 705/44; 705/35
(58) Field of Classification Search .................... 705/44, 705/35
See application file for complete search history.

(56) References Cited

U.S. PATENT DOCUMENTS

| | | | |
|---|---|---|---|
| 6,047,268 A * | 4/2000 | Bartoli et al. .................... | 705/35 |
| 7,003,497 B2 * | 2/2006 | Maes .............................. | 705/64 |
| 7,716,129 B1 * | 5/2010 | Tan et al. ......................... | 705/40 |
| 2002/0087894 A1 * | 7/2002 | Foley et al. .................... | 713/202 |
| 2003/0126083 A1 * | 7/2003 | Seifert et al. .................... | 705/43 |
| 2003/0187784 A1 * | 10/2003 | Maritzen et al. ................ | 705/39 |
| 2003/0200172 A1 * | 10/2003 | Randle et al. ................... | 705/39 |
| 2006/0073808 A1 * | 4/2006 | Buchert ......................... | 455/406 |
| 2006/0229996 A1 * | 10/2006 | Keithley et al. ................. | 705/75 |
| 2006/0253392 A1 * | 11/2006 | Davies ............................ | 705/40 |
| 2007/0239556 A1 * | 10/2007 | Wagner .......................... | 705/26 |

FOREIGN PATENT DOCUMENTS

| WO | WO 03/015043 | 2/2003 |
|---|---|---|
| WO | WO 2005/031667 | 4/2005 |
| WO | WO 2006/018709 | 2/2006 |

OTHER PUBLICATIONS

Citrix Enhances Security and Identity Management With Support for Authentication Devices From 14 Vendors (Mar. 2004). Business Wire. p. 5175. Retrieved Dec. 5, 2012.*
Annex to Form PCT/ISA/206—Communication Relating to the Results of the Partial International Search for corresponding International Application No. PCT/GB2007/004078.

* cited by examiner

*Primary Examiner* — Kito R Robinson
(74) *Attorney, Agent, or Firm* — Saul Ewing LLP

(57) ABSTRACT

The present invention provides a service for allowing secure financial transactions to be carried out, the service involving authenticating a user's identity and/or status as part of a financial transaction with another party and in the event that the user is authenticated arranging for the transaction to be completed without revealing the user's financial details and/or other personal details to that other party. Authentication data and transaction data may be communicated over any suitable communications channel(s). The invention provides a trusted authentication and payment environment that protects a user's financial details, but allows them to be securely authenticated and arranges for transactions to be fulfilled, while providing other parties with reassurance that transactions will be completed. In this way, fraud and theft due to misappropriation of financial details can be minimized.

83 Claims, 23 Drawing Sheets

SECURE AUTHENTICATION AND PAYMENT SYSTEM

The present invention relates to a system, method and apparatus for identity authentication and/or secure payment.

BACKGROUND OF THE INVENTION

Technology has revolutionized the way that consumers make purchases and expanded the range of retail channels. Goods may be purchased in a range of ways including traditional face-to-face purchases, mail order and telephone order as well as more recent retail formats such as Internet shopping, purchase by mobile phone and other contactless purchase methods. The number of payment options has also expanded to suit and include credit cards, debit cards, charge cards, contactless wallet payment systems such as Oyster, Speedpass and vending cards, direct debit from bank accounts and payment using mobile phone accounts. This proliferation of payment and retail systems, whose transactions are often conducted remotely or between consumers and merchants who have little or no prior relationship, has led to a change in the security challenges faced by consumers, merchants and financial institutions.

Using existing payment card systems in transactions such as mail order, Internet shopping and purchases over the telephone, a consumer gives their complete payment and identity details up front and has to trust that the goods and services will be delivered and that the merchant is legitimate and uses the details given only for processing that order. This exposes the consumer to identity theft, theft of payment details and payment fraud via, for example, phishing, swiping cards through non-authorized card readers and simple misuse or copying of card details. These theft and fraud threats are not presently secured by existing payment security methods such as those typically employed by credit card processors. Similarly, merchants must trust that the consumer has given the correct identity, is an authorized user of the payment method and that the payment details are correct. In addition, merchants are exposed to identity fraud or deception where payment or account details have been stolen.

To meet these challenges, credit card companies and financial institutions are putting security measures into place. The introduction of chip and PIN (EMV authentication) in the UK for card transactions has reduced fraud in the face-to-face market. Whilst this is undoubtedly a significant improvement in security, face-to-face fraud does still occur, exemplified by some major merchants withdrawing their chip and PIN payment terminals after their compromise. Indeed, a direct consequence of chip and PIN at point of sale is that consumers are now open to greater risk of shoulder surfing. Further threats to security may arise from the use of electronic "bugging" equipment in point of sale terminals.

Card detail theft is also an issue, with fraudsters using legitimate card details to perpetrate non-face-to-face and face-to-face payment theft. This is because existing terminals and PIN pads are designed to accept many cards from consumers without requiring specific validation by the merchant or staff members before use. In addition, terminals that are not validated by the registered merchant can give rise to high fraud levels if compromised. This is due to the lack of accountability over their security, and the nature, size and technical needs of existing terminals and PIN pads, making it difficult to keep them secure when not being used. Furthermore, card details taken from the face and back of payment cards can be fraudulently used across non-chip and PIN channels.

SUMMARY OF THE INVENTION

According to the present invention, there is provided a service for allowing secure financial transactions to be carried out, the service involving authenticating a user's identity and/or status as part of a financial transaction with another party and in the event that the user is authenticated arranging for the transaction to be completed without revealing the user's financial details and/or other personal details to that other party.

Authentication data and transaction data may be communicated over any suitable communications channel, and in some circumstances are preferably communicated over different communications channels.

The invention provides a trusted authentication and payment environment that protects a user's financial details, but allows them to be securely authenticated and arranges for transactions to be fulfilled, whilst providing other parties with reassurance that transactions will be completed. In this way, fraud and theft due to misappropriation of financial details can be minimized.

Authenticating the user may involve receiving authentication data input by the user via a communications channel. Multiple communications channels may be available. For example, user data may be received via a wireless telecommunications network and/or the Internet and/or e-mail and/or any other suitable communications channel. Preferably, the method involves allowing the user to select a preferred communications channel. Different communications channels may be selected for different transaction types. For example, the user may prefer to communicate authentication data via a mobile telephone network, when transacting via the Internet.

Communications to the user may be sent via any suitable communications channel, for example a wireless telecommunications network and/or the Internet and/or e-mail. Preferably, communications to the user are sent via a different channel to those from the user. For example, messages may be sent to the user via e-mail but received from the user via a mobile telephone network. Events of which the user may be notified include authentication failures and/or mismatch of order details supplied by differing users and/or the order is available for dispatch and/or the order is only partially fulfilled and/or a payment is refused and/or a transaction has been referred and/or the consumer has, or is close to, breach of their operating parameters. A confirmation may be sent and payment may be withheld until the confirmation is received. The user being notified may have to provide identification information before access is given to the notification.

The authentication may be two-stage, but preferably is three-stage. Each authentication stage may involve input of personal identification numbers and/or code words and/or personal details and/or answers to challenge questions and/or matching of a user with a list of authorized users for a transaction device and/or cross referencing two or more sets of input authentication data. Authentication may involve comparing the input data with user related data stored by the system. Authentication may involve online and/or offline authentication stages.

The service may allow a user to register one or more payment means. The user may assign a particular payment means for use in specified transactions. For example, the user may specify that a credit card is to be used for Internet transactions, but a debit card is to be used with person to person transactions. Additionally or alternatively, the user may specify that a particular card or account may be used for transactions only with a particular organization, such as a merchant or retailer. Payment may be made when the paying user's authentication/identification code is provided rather than details of the payment means to be used.

One of the user's payment means may be used in the step of authenticating the user. The payment means used for authentication is preferably different from the payment means used to complete the transaction. This provides an added level of security for the user.

The service may further include storing authentication data associated with at least one user and authentication is by comparing data supplied by the user with stored authentication data. The authentication may be associated with a transaction. The transaction may be a purchase or a cash withdrawal or money transfer.

The service may further include defining operating parameters for a user and checking that transactions do not breach those operating parameters before making payment.

The service may further involve allocating a user identification code to a first user, providing the first user's identification code to a second user and comparing the first user's identification code with data stored in user records to confirm that the first user is a registered user of the system.

Payment may be held in escrow until goods have been dispatched. This provides an added level of security for users, especially when the transaction is via Internet or mail order.

According to another aspect of the invention, there is provided a transaction system that is configured to authenticate a user and arrange a financial transaction with another party based on the user's authentication and without disclosing the user's financial details and/or personal identity to that other party.

Preferably, the transaction is payment for goods and/or services. Preferably, the system includes authentication means for authenticating the user and payment means that are functionally and/or physically separate from authentication means, the payment means being adapted to arrange for payments.

By separating authentication from the transaction, users can be authenticated and transactions authorized without providing the user's financial details to other users. This provides protection against misuse of, for example a user's debit or credit card, should it become compromised. In this way, fraud and theft due to misappropriation of financial details can be minimized.

All users that are party to a transaction may be authenticated in the same way, regardless of whether they are retailers or consumers. This minimizes fraud on both sides of a transaction.

The system may be adapted to receive order details from at least two users, for example a consumer and a merchant, and to compare the order details received from each user to ensure that both sets of orders are identical. The system may be adapted to arrange payment only if the order details match. In this way the system can minimize errors in the order process and also fraudulent altering of transactions.

The system may be adapted to arrange payment directly from a user account, for example a credit or debit card account or any other financial vehicle provided to allow the user to make payments. Alternatively, before forwarding arranging for payment from a user account, the system may be adapted to receive payment and hold it in escrow until goods are dispatched or services provided and/or the user acknowledges the payment is valid.

The payment may be a cash withdrawal or cash advance. The system may be adapted to be used with transactions over one or multiple transaction channels. This may be achieved by provision of a communications system for allowing users to interact with the system via for example the Internet (and other networks using an IP protocol), telephone or mobile data communications services.

The transaction channels may include face-to-face, mail order, telephone order, Internet shopping, user-to-user transfers, purchase by mobile phone and other contactless purchase methods. In this way, the system provides a unitary authentication and payment management system that can be used in many retail formats, allowing the user to use one account and authentication method to centrally control many payment means and authenticate and arrange payment in many transaction channels.

The system may be adapted to apply the same authentication regardless of transaction channel, so that a consistent level of security is applied in all transactions. Alternatively, differing authentication may be applied to differing transaction channels. This allows the degree of authentication to be tailored to suit factors related to the transaction channel such as the inherent security of the transaction channel.

The system may be adapted to store authentication data associated with at least one user on the system. The system may authenticate the user's identity and/or status by comparing data supplied by the user with stored authentication data. The system may be adapted to carry out authentication associated with a transaction.

The system may be adapted to receive data from a transaction device, the transaction device having means for inputting data and means for communicating data to the system. The means for inputting data may be a keypad and/or a trackball and/or a joystick and/or a biometric feature reader and/or a reader. The biometric feature reader may include a fingerprint reader and/or a retinal scanner and/or a voice analyzer. The card reader may be a chip card reader and/or a magnetic strip card reader and/or a radio frequency identification (RFID) card reader.

The means for communicating data may include any wireless or mobile telecommunications apparatus and/or bluetooth communications apparatus and/or WiFi communications apparatus, such as WiFi 802.11a/b/g communications apparatus and/or infrared communications apparatus and/or RFID communications apparatus and/or NFC communications apparatus and/or a USB port and/or a firewire port. The mobile telecommunications apparatus may be adapted to operate over GPRS or 3G or GSM or CDMA networks.

The means for communicating data may be adapted to allow the transaction device to communicate with payment systems, for example RFID or NFC based payment systems, to allow the transaction device to operate in place of the payment means, e.g. a RFID card such as an Oyster card, associated with the payment system.

Authentication may involve at least two-stages, and preferably three. Each authentication stage may require input of personal identification numbers and/or code words and/or personal details and/or answers to challenge questions and/or biometric data and/or matching of a user with a list of authorized users for a transaction device and/or valid reading of an EMV compliant card or other registered identity card and/or cross referencing two or more sets of provided authentication data. Authentication may involve comparing the input data with user related data stored by the system. Authentication may involve online and/or offline authentication stages.

The system may be adapted to store user names and/or user identification codes and/or user addresses and/or user address codes and/or user payment account details and/or user operating parameters and/or user transaction histories and/or audit trails.

The system may be adapted to process orders using a user identification code and a delivery address code uniquely associated with a user. The system may be adapted to receive the delivery address code of a first user, determine the address corresponding to the delivery address code and to provide the address to at least a second user only when the at least second user confirms that it is in a position to fulfill the transaction. By only revealing a user's address once all the users have been authenticated and only at a stage in the transaction when the information is necessary, the disclosure of user information is minimized, helping to prevent identity fraud.

The system may be adapted to have more than one payment means associated with each user. Each payment means may be assigned for use in specified transactions. The system may be adapted to use a payment means to carry out a payment after authenticating both users and when provided with the paying user's identification code rather than details of the payment means (e.g. PayPal, credit card, etc.) to be used. This again minimizes the information disclosed by a user during a transaction and helps prevent identity fraud and misuse of payment details.

The system may be adapted to send a notification to users to confirm events. The notification may be a short message service (SMS) message, e-mail, telephone call or message sent to a transaction device. Preferably, the notification is via a different notification method to the placing of the order. In this way, if a communications means is compromised and used to place a fraudulent transaction, then the user will receive notification of the transaction by a different communications channel, allowing them to detect and stop the fraudulent transaction.

Events of which the user may be notified may include authentication failures and/or mismatch of order details supplied by differing users and/or the order is available for dispatch and/or the order is only partially fulfilled and/or a payment is to be made and/or a payment is refused and/or a transaction has been referred and/or the consumer has, or is close to, breach of their operating parameters.

The system may be adapted to require a confirmation to the notification before processing a payment. The system may be adapted to obtain identification information from the user before providing access to the notification so as to prevent erroneous notification of someone other than the user.

The system may be adapted to assign at least one user identity code to at least a first user, whereby the authentication means are adapted to validate the identity and/or status of the first user to a second user upon provision of the first user's identity code to the system by the second user.

The user data used for validation may be whether or not a user is a registered user of the system and/or the user is transacting within specified criteria and/or the user account has permission for carrying out that transaction. The specified criteria may include that transactions values and/or transaction velocities are within a set limit or that the transaction is of a specified type. This allows the users to have increased confidence in transacting with other users.

Each user may be associated with at least one sub user. The system may be adapted to register users or sub-users and to only allow access to the system by registered users or sub-users. For example, pre-registered and designated staff (sub-users) may transact on behalf of a retailer (user). This allows for individual traceability and accountability. Authentication of a user may include authentication of at least one associated sub-user.

The system may require re-authentication by at least one user if a transaction has not been completed within a specified time-scale. The system may require at least one user to review and/or accept a transaction if the transaction has not been completed within a specified time-scale.

The system may be adapted to allow each user to make or receive payments in a currency of choice. The system may be adapted to convert the currency of a payment such that the currency in which a payment is made is different to the currency in which the payment is received.

According to yet another aspect of the invention, there is provided a transaction device for collecting and communicating authentication data having data input means and communications means for use with the method and system of the other aspects.

According to a fourth aspect of the present invention, there is provided a computer program, or a storage means containing a computer program or a server programmed with a computer program for implementing any of the other aspects of the invention.

According to yet another aspect of the invention, there is provided a method involving using an authentication means associated with a consumer to authenticate a merchant. Preferably, the authentication means is an authentication device, for example a mobile wireless authentication device. Preferably the consumer device comprises a card reader and/or a keypad and/or biometric feature reader and/or an RFID detector. Preferably the method further involves arranging payment from the consumer to the authenticated merchant using the consumer's authentication means.

BRIEF DESCRIPTION OF THE DRAWINGS

Various aspects of the invention will now be described by way of example only and with reference to the accompanying drawings of which.

SPECIFIC DESCRIPTION OF THE DRAWINGS

Figure 1:
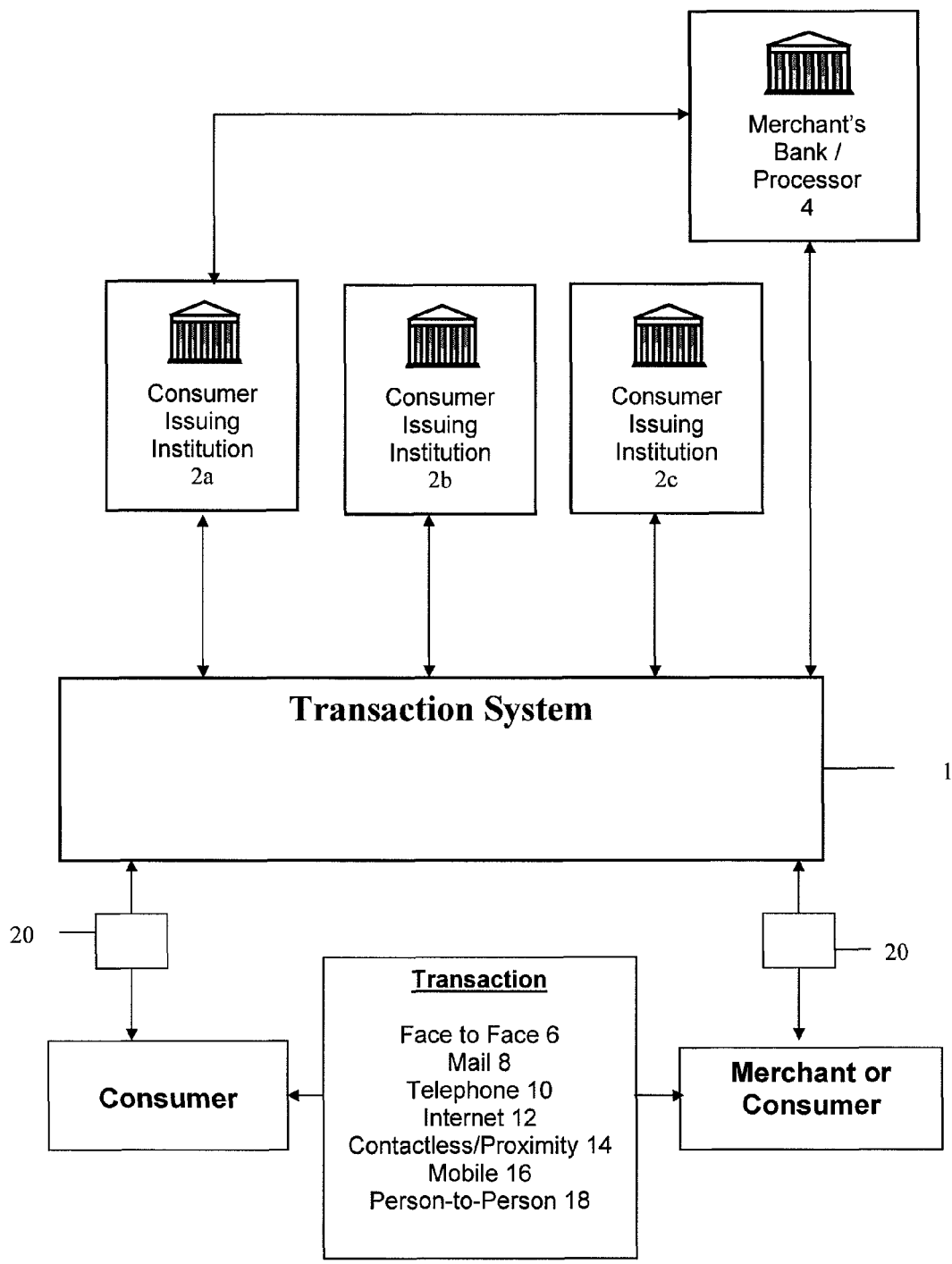
FIG. 1 is an overview of the interaction between an authentication and payment system, users of the system, payment account issuers and merchant and payment acquiring banks and processors.

FIG. 1 shows a secure transaction system 1 that is run by a system operator for identity authentication and authorizing payment. The transaction system 1 is able to communicate with users that are transacting with one another, for example a consumer and a merchant. It is also able to communicate with the systems of institutions 2a-c, 4 that provide users with financial services, for example banks, credit card companies etc. The transaction system 1 acts as a gateway for authenticating the identities of users who are parties to transactions and for arranging for payments to be made without disclosure of a user's financial details. To do this, the system 1 implements security procedures at various stages in a transaction and controls and arranges payment from one user to another user only when one and preferably both users have been fully authenticated and without the paying user's financial details, for example credit or debit card details, being revealed to the other user.

The transaction system or system operator 1 is not a bank or payment provider but sits between these providers and the user, and acts as a secure, trusted system for arranging payment from one user to another once a transaction has been fulfilled and only once the identities of both users have been authenticated and appropriate security checks have been completed. The system 1 is not designed to replace a merchant's ordering system and transactions are still conducted between a consumer and the merchant over conventional commercial channels, such as face-to face interaction 6, mail order 8, telephone order 10, Internet shopping 12, contactless 14, mobile 16 and person-to-person 18 payment. Instead, the system 1 allows a user to transact with merchants over numerous different channels, using a single authentication means 20 to interact with the system 1, thereby to be authenticated and arrange for payment, without having to reveal financial details to the merchant. The system 1 provides multi-channel, consistent anti-fraud measures and validation services to users to ensure that the other users involved in the transaction are who they claim and are transacting within allowed limits. Transactions can be recorded with the system 1, but only to allow checks that the transaction is as expected and to release user information or arrange payment at appropriate stages in the transaction.

By having the authentication and security aspects of a transaction handled separately from the users, banks or other facilities that can arrange payment and ordering systems, the system 1 can be implemented to operate consistently with a wide range of payment means and use a range of transaction channels 6-18. Use of the system brings the same level of security and protection across multiple commercial channels 6-18. In addition, authentication is carried out on a transaction level, not on a payment level. These aspects allow the user to interact with a single, unitary authentication and security system 1 thereby to authorize payment from any of their nominated accounts, rather than having to deal with a multitude of specific authentication and payment systems tied to certain payment facilities, for example banks or credit card providers, merchants or transaction channels.

Figure 2:
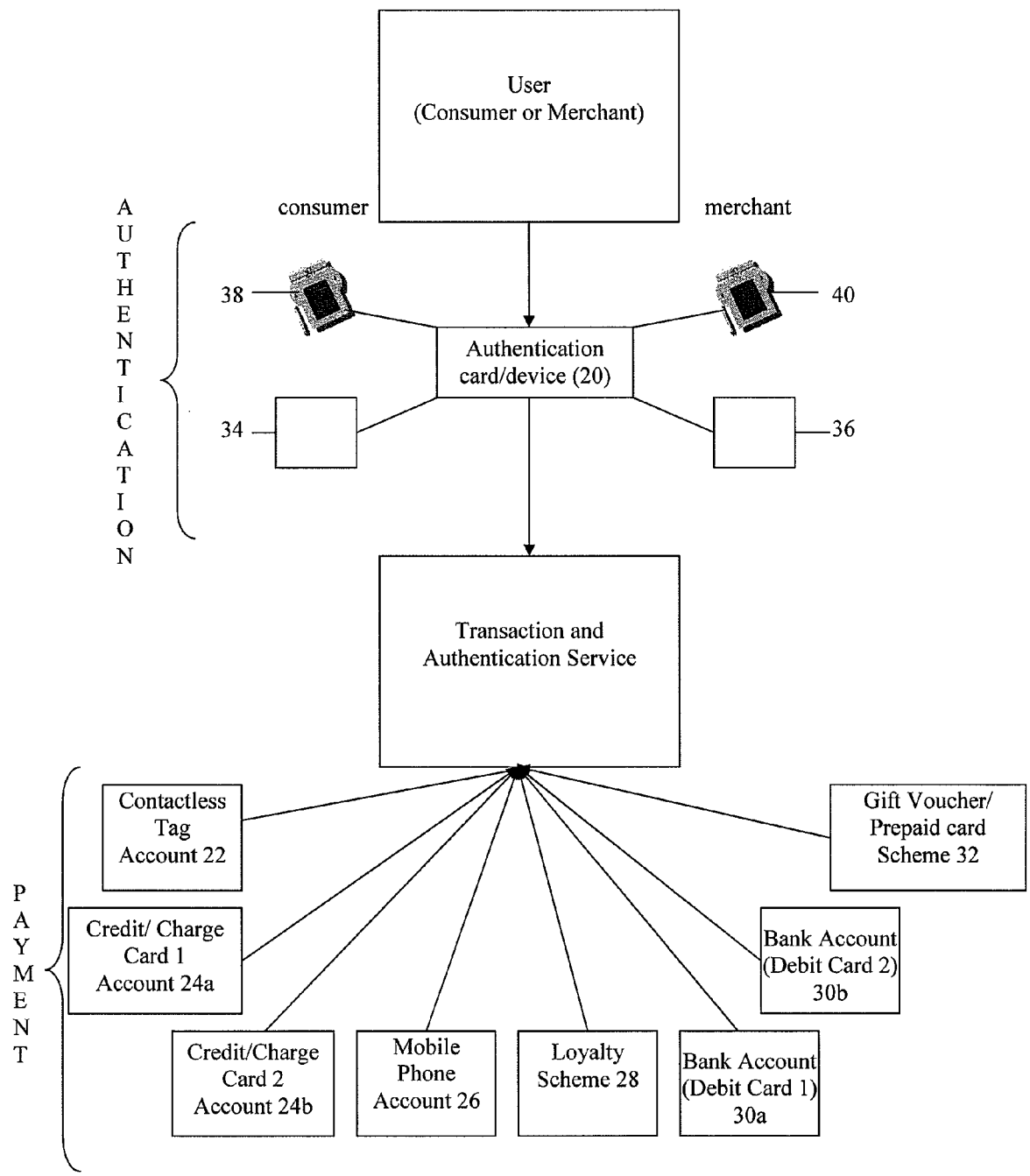
FIG. 2 is a schematic representation of how the authentication and payment system interacts with a user and the user's accounts.

As shown in FIG. 2, the single user authentication means 20 can be used for authentication, whilst providing access to at least some and optionally all payment channels nominated by that user, for example a contactless tag account 22, a first credit card account 24a, a second credit card account 24b, a mobile telephone account 26, a loyalty scheme 28, a first bank account 30a, a second bank account 30b, and a gift voucher scheme 32. The authentication means could be for example a dedicated consumer ID card 34/merchant card 36 and/or consumer authentication device 38/merchant authentication device 40 or could be a credit or debit card that the user has nominated for use in the authentication process. Since the authentication and payment processes are decoupled, even where a credit or debit card is used for authentication, this does not necessarily have to be used for payment. Indeed by using one card for authentication and another for payment, security can be increased. For example in the arrangement of FIG. 2, a credit card could be used for authentication, but the user could arrange for payment via any one or more of the contactless tag account 22, the first and second credit card accounts 24a,b, the mobile telephone account 26, the loyalty scheme 28, etc.

Figure 3:
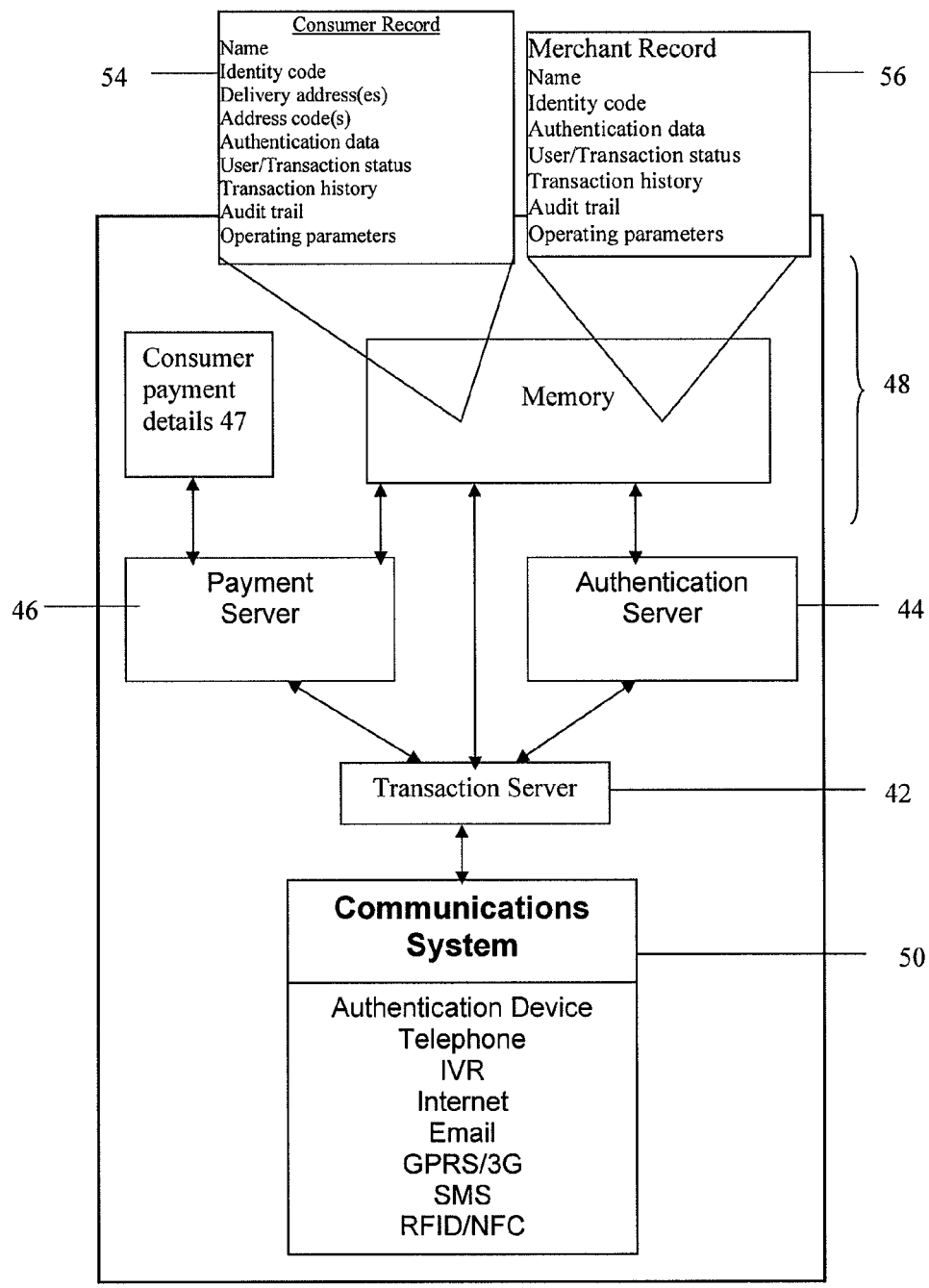
FIG. 3 is a schematic of the authentication and payment system of FIG. 1.

FIG. 3 shows the transaction system 1 in more detail. This includes a transaction server 42 for applying security procedures to transactions; an authentication server 44 for authenticating user identities; a payment server 46 for liaising with the consumer's payment means 47 and arranging actions, such as payments or bank transfers, on behalf of users; storage media 48 for storing data relating to users, transactions and operating parameters; and a communications system 50 for communicating with users, other parties such as issuing institutions, and operators of the system. The transaction server 42, authentication server 44, payment server 46 and any server required by the communications system 50 may be physically separate. Alternatively, one or more of the transaction system server functions 42-50 may be incorporated within the same physical server.

The transaction system 1 acts as a gateway so that users can control what information is provided to other users and at which point in the transaction that information is provided. As all users are part of a trust network, they can have confidence that certain information is held on the system 1 and can be used, or appropriately accessed, to complete the transaction. This negates the need for a user to supply that information, which prevents it being used fraudulently by another user. This gateway function is facilitated by the transaction server 42, which is adapted to carry out security operations at various stages of the transaction. The security operations may include storing details of a user and arranging actions using the user's details rather than revealing the details to the other users, for example by arranging payments from one user to another without revealing details of the payment channel 47.

The security operation may only reveal certain details of the user at an appropriate stage in a transaction, for example, for non-face-to-face transaction where goods are not provided at the point of sale, by revealing address details only when goods are ready for dispatch.

Further security operations carried out by the transaction server 42 include allowing users to record expected transactions with the transaction system 1, the transaction server 42 being adapted to compare the transactions to ensure that they match. The transaction server is further adapted to record in the memory 48, at least in an aggregated or generalized manner, each user's transaction history and monitor user transactions against a series of operating parameters to allow further control of the user's account and to limit exposure to fraud. The transaction server 42 is also adapted to notify the user at various stages in a transaction using the communications system 50 such that users are aware of details of the transaction and can detect and stop fraudulent transactions.

The transaction system 1 is adapted to register users of the system only on completion of a series of registration checks. To ensure that a user wishing to take part in a transaction is the registered user, the authentication server 44 authenticates their identity using at least two-stage (double) and typically three-stage (triple) authentication as will be described in more detail later. In this way, other users of the system 1 can have confidence that they are transacting with another member of a trusted network, upon whom certain checks have been made and whose identity has been authenticated. The authentication server is also adapted to allow users to check that other users are registered with the system 1 by submitting a user identification code, amongst other details, to the authentication server 44 which is adapted to compare the supplied consumer identification code and details with those stored within user records to provide an indication that the user is a registered user.

The memory/storage media 48 includes a fast access, high capacity storage system, such as a hard disk bank, although any suitable storage means may be used. User records, for example consumer records 54 and merchant records 56, are stored in the storage medium 48. These include user data such as name, identity code, delivery and billing addresses and associated address codes, details of payment means such as credit card 24$a,b$, debit card 30$a,b$ or bank account 30$a,b$ details, authentication data such as passwords, PIN codes and challenge questions such as the user's mother's maiden name, school, place of birth, etc, data required to comply with regulating authority regulations, service settings such as preferred payment methods and operating parameters, such as maximum transaction volume, value and type settings, transaction data, audit trails and user/transaction status such as "active", "on hold", etc.

The authentication server 44 is able to access the storage media 48 for recording and accessing user records 54, 56, transaction histories and audit trails and the communications system 50 for communicating with users, authentication devices 38, 40 and service operators. Authentication requests and data are received from users via the communications system 50. The authentication server 44 is adapted to process the requests and data via a triple authentication method for requests received from an authentication device 38, 40, or by a double authentication method for requests received without use of an authentication device 38, 40, and return an identity validity indication to the payment server 46, transaction server 42 or requesting user via the communications system 50.

The payment server 46 is operable to process payment requests and communicates these to the user's payment means issuer 2$a$-$c$. The payment server 46 is arranged to process payment requests only when certain criteria have been met, such as authentication of both users by the authentication server 44, the transaction leading to the payment request does not breach operating parameters of either user or that the transaction expected by each user matches the transaction expected by other users that are party to that transaction. As the payment server 46 handles any payment request and arranges payment, when a consumer and a merchant are transacting, the consumer's financial details are not available to the merchant.

The payment server 46 is able to access the storage means 20 to retrieve user details, such as the user's payment means 22-32, required to carry out the action. The payment server 46 also has access via the communications system 50 to the servers of other parties involved, e.g. issuers of payment means 2$a$-$c$, such as a credit card company or bank. The payment means 22-32 may be a credit card account 24$a,b$, a debit card account 30$a,b$, a bank account such as a current account, a contactless account 22 such as an Oyster card, a customer loyalty scheme account 28, a gift card scheme 32 or a mobile phone service account 26. The payment means 22-32 is operated, and any payment made, by a payment issuer 2$a$-$c$ such as a bank or credit card company separate from the transaction system 1. The payment server 46 is adapted to act as an intermediary to process payment requests and arrange payment upon completion of orders, obtain validations of consumer payment means 22-32 from issuers 2$a$-$c$ upon request from a merchant, or other authenticated user (for example for user-to-user transactions such as via PayPal or Western Union transfers), and arrange chargebacks and credits.

Figure 4:
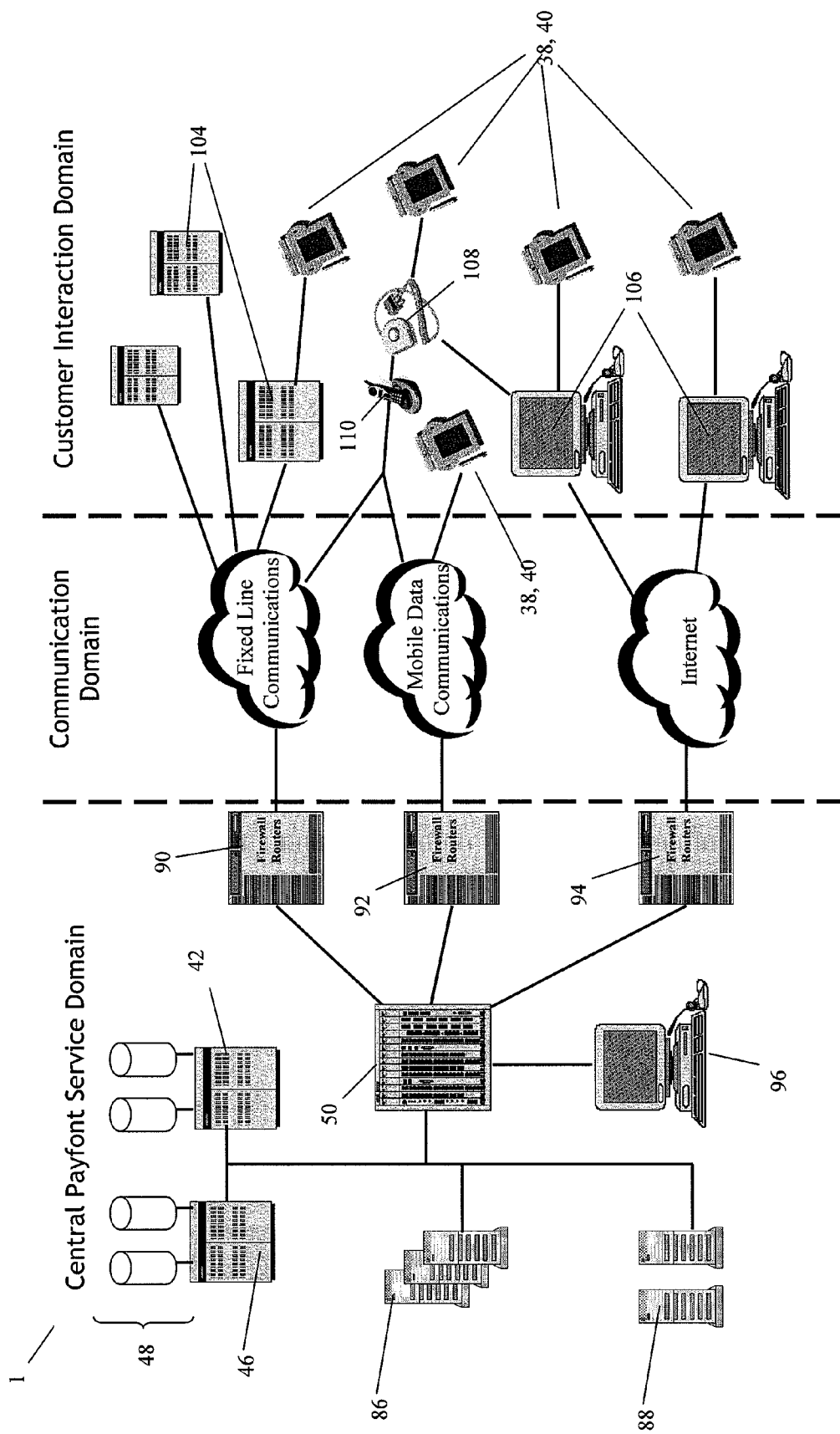
FIG. 4 is a further schematic of the components of the authentication and payment system of FIG. 1 and its interaction with users.

FIG. 4 shows the communications system 50, which links the transaction system 1 with various parties involved in the placing and processing of transactions such as consumers, merchants and financial institutions/payment issuers 2$a$-$c$, 4. Various servers and associated hardware are provided, such as an Extranet/Internet server 86 and mobile communications server 88. Also provided are appropriate firewall routers for fixed line communication 90, mobile data communication 92 and Internet communication 94. The communications system 50 is adapted to provide communications by a range of methods such as Internet communications, e-mail, GPRS, SMS, RFID, telephone, Interactive Voice Response (IVR) as will be described in greater detail later. The communications system 50 also provides link to terminals 96 for allowing system operator staff to access the transaction system 1, for example in response to telephone enquiries. Users can communicate with the transaction system 1 by one communications method, and the system 1 can notify the user of transactions by another communications method. These communications methods can be pre-defined by the user. For example, the user may opt to send instructions and/or information to the system 1 via mobile telephone, but receive information via the Internet. This helps prevent fraudulent or unauthorized intervention through unauthorized access to a single communications medium. In addition, it allows the transaction system 1 to be used with a variety of transaction types and negates the necessity for every user to have expensive processing terminals.

Figure 5:
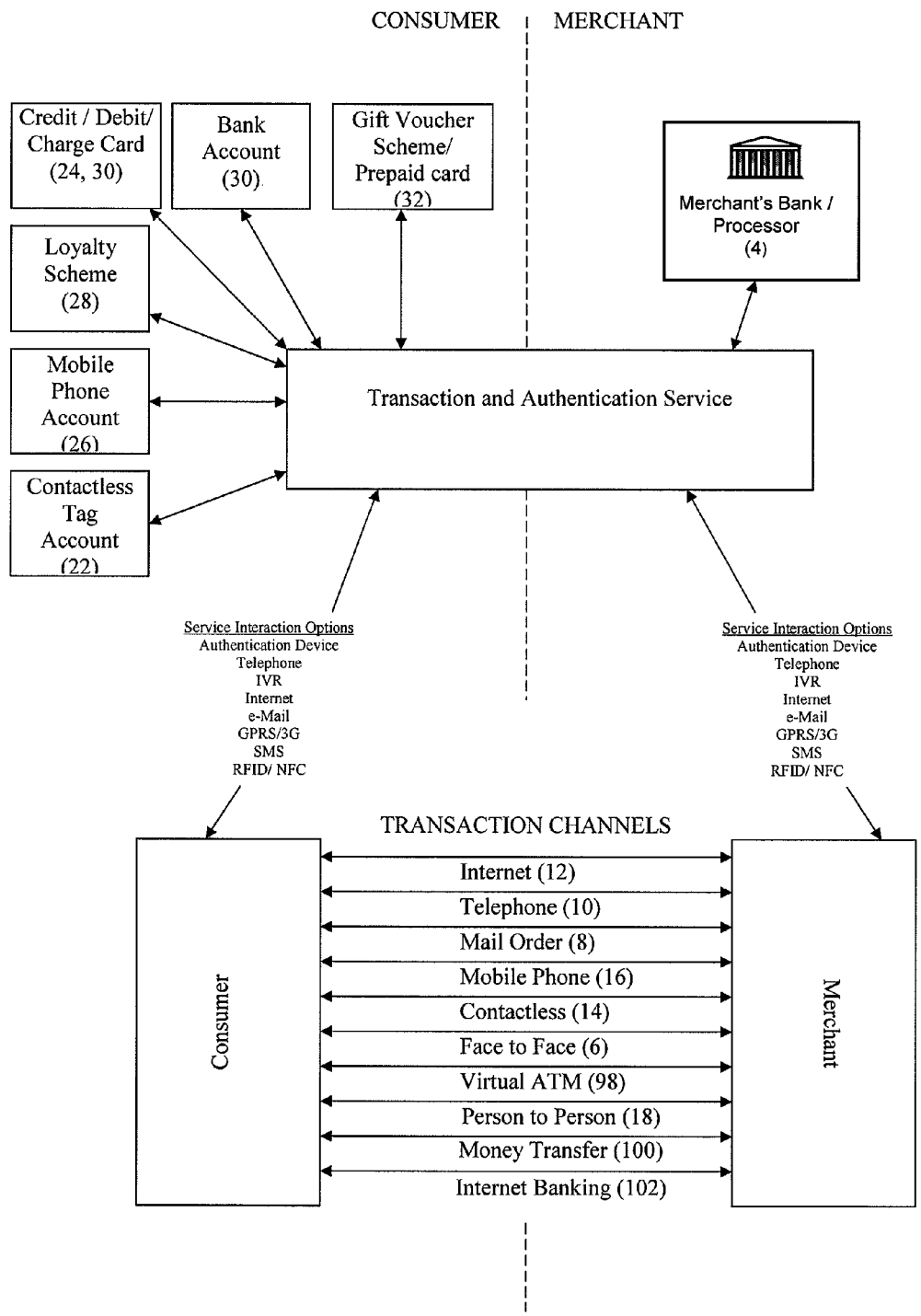
FIG. 5 shows how users can interact with the system of FIG. 1.
Figure 6:
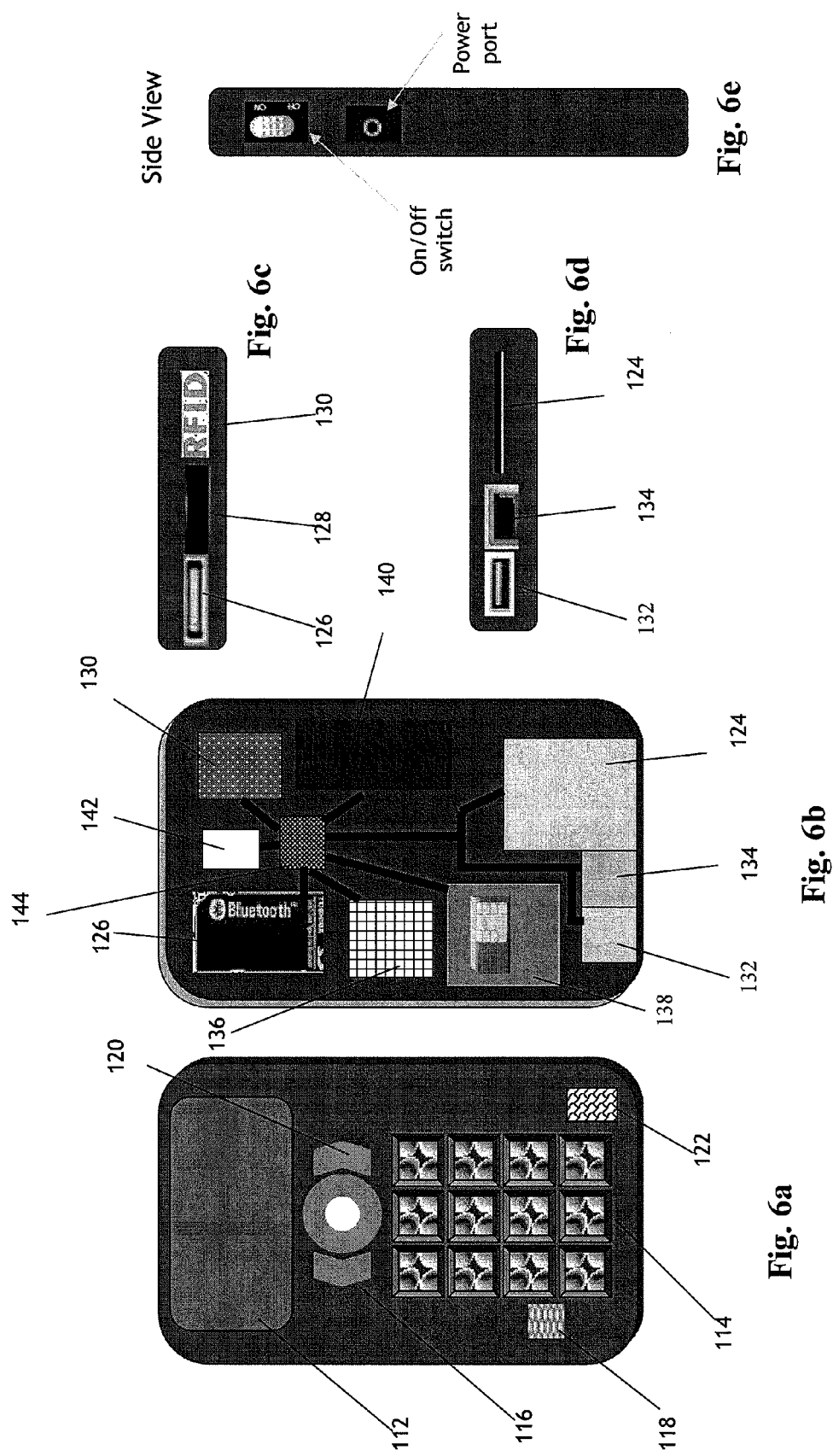
FIG. 6a is a front view of an authentication device for use with the transaction system 1 of FIG. 1.
FIG. 6b is an internal view of an authentication device for use with the transaction system 1 of FIG. 1.
FIG. 6c is first side view of an authentication device for use with the transaction system 1 of FIG. 1.
FIG. 6d is another side view of an authentication device for use with the transaction system 1 of FIG. 1.
FIG. 6e is yet another side view of an authentication device for use with the transaction system 1 of FIG. 1.

FIG. 5 shows the transaction types supported by the system 1. These include mail order 8, face-to-face 6, Internet ordering 12, telephone ordering 10, Internet 102 and telephone banking and transactions 16 using mobile communications technology such as various technologies employing WAP, i-mode, 3G and GPRS. As shown in FIG. 4, merchants' servers 104 can access the transaction system 1 directly via fixed line communications or over the Internet or Extranet.

Authentication devices 38, 40 belonging to consumers or merchants access the system via mobile communications capability directly contained within the authentication device 38, 40 or indirectly via connection to a user's terminal 106 or via an adapter or modem 108 to another communications system such as a telephone line 110. Users may also access the system via voice telecommunications 110 to an operator 96 or to an IVR service. Access via a user mobile telephone 110 may additionally include use of messaging services such as short messaging service (SMS) messages or access via a mobile browser such as WAP or via a direct network link such as those available over 3G networks. These communications are intercepted and decoded by the mobile communications server 88. Users, whether merchants or consumers, may access the system from terminals 106 such as PC's over the Internet, which are via an interactive Extranet or Internet service and controlled by the Internet server 86.

FIGS. 6a-e show an authentication device 38, 40 for allowing input of user authentication data, communications of data to and from the transaction system 1 and display of instructions from the transaction system 1 to the user. The authentication device 38, 40 has a display 112; data input devices as appropriate such as a keypad 114, trackball 116, microphone 118, touch pad (not shown), and/or buttons 120; a biometric information reader 122 such as fingerprint scanner or a retinal scanner; a card reader 124 such as a chip card reader, preferably Europay MasterCard Visa (EMV) compliant, and/or magnetic strip card reader and/or an RFID card reader; cable and/or wireless communications means such as a Bluetooth port 126, an IR port 128, RFID port 130, USB port 132, Firewire port, 802.11a/b/g wireless ("Wi-Fi") communications apparatus 136 and/or mobile telecommunications apparatus 138 including a SIM card and SIM card reader; and a rechargeable battery 140; along with the associated hardware required to run each of these components, as would be understood by a person skilled in the art. The authentication device 38, 40 further contains memory 142 and processing means 144 for storing data, processing operations and controlling the components. The authentication device may comprise separate logical and/or physical memory configurations for payment and other functions.

The authentication device 38, 40 is associated with certain users and locked for use by those users. The users authorized to use the authentication device 38, 40 and associated identification data required to unlock the device 38, 40, such as PIN code or consumer ID code are stored in the memory 142 of the authentication device 38, 40, which is updated from the transaction system 1 via the communications system 50. The device 38, 40 will only become operable to communicate authentication data to the transaction system 1 once a user has validated their identity, for example by using an identity card and/or PIN and/or ID code. Data can be input to the device 38, 40 in response to prompts displayed on the display 112. Activation of individual input devices 114-124 or operation of the display 112 may be in response to software stored on the authentication device 38, 40 or in response to instructions received from the transaction system 1 via at least one of the communications means 126-138.

The communications means 126-138 of the authentication device 38, 40 are adapted to link the authentication device 38, 40 with the transaction system 1 and may be used to send update data, user data or instructions to the authentication device 38, 40 or to relay authentication data to the transaction system 1. The preferred communications route is via encrypted mobile communications over networks such as GPRS or 3G. In an optional embodiment, the card reader 124 may be adapted to receive contactless payment cards, including RFID cards such as Oyster, Speedpass or vending system cards. The RFID port 130 of the authentication device can then be used to communicate between the authentication device 38, 40 and a contactless card system to make payments. This allows for use of contactless payment cards or accounts to be made dependant on completion of the authentication procedures. The contactless card may be used to make payments over other payment channels 24-32 via the transaction system 1. In this, case the contactless card could be preloaded with funds and used as a user's payment account for transactions via the transaction system 1. Conversely, other payment accounts, e.g. credit 24 or debit cards 30, could be used to make contactless payments.

Figure 7:
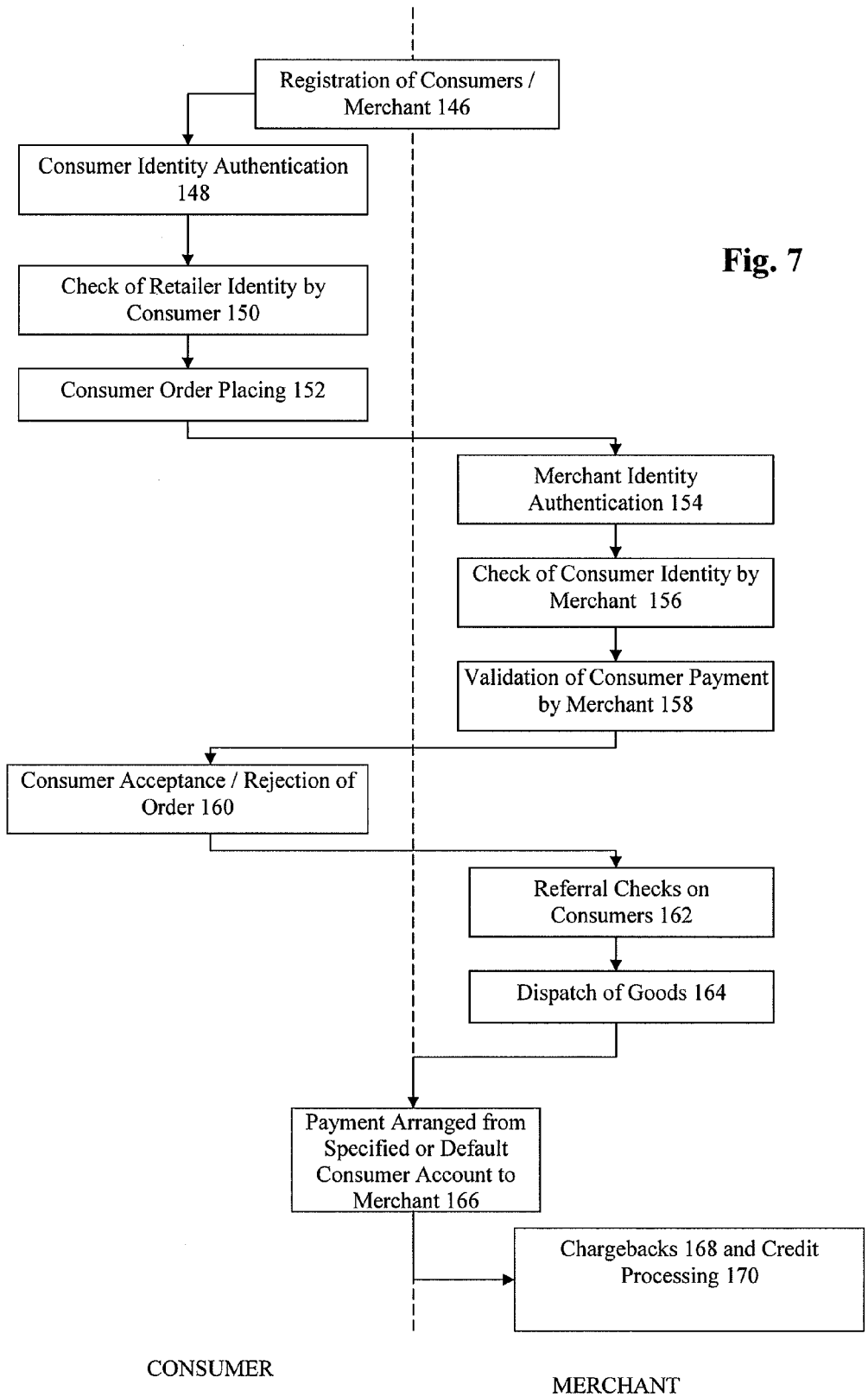
FIG. 7 is a flow diagram of an authentication and payment method.

FIG. 7 shows the steps for authenticating users using the transaction system 1 to facilitate a secure transaction, including authenticating the identities of users who are parties to a transaction and controlling delivery and payment. All parties to a transaction must be registered users of the transaction system 1 before being allowed access to the system 1. A potential user must first complete a registration procedure 146 to obtain details necessary for operation of the transaction system 1 and to ensure that all the details are correct and that all regulatory requirements are met. The users can be specified as being consumers, who only use the transaction system 1 to make purchases from a merchant, or merchants, who use the transaction system 1 to make sales to a consumer or another merchant acting as a consumer. A merchant may also make purchases and any reference to a consumer includes merchants when making a purchase. For transactions such as person-to-person or Western Union type transfers, both users may be consumers, with one user acting as a 'merchant' in so much as they receive a payment. As an optional feature, the transaction system 1 may act as a directory or database of merchants offering services or products through which consumers may browse to locate a suitable supplier with whom they can transact in a safe and secure fashion. At the end of the registration procedure, each consumer is given a consumer identity code and each merchant is given a merchant identity code.

Once registered, a consumer wishing to make a transaction with a merchant must first access the transaction system 1 and authenticate 148 their identity to prove that they are who they claim to be and that they are registered on the transaction system 1. After the consumer has been authenticated 148, they request validation 150 of the identity of the merchant with whom they wish to transact by sending to the transaction server a merchant identity code. This would be supplied to them by the merchant by normal commercial means, e.g. via a website or advert. The authentication server 44 is then operable to compare the supplied merchant identity code with those stored on the transaction system 1. A positive match allows the consumer to have confidence that the merchant has passed the transaction system registration checks and is operating within its operational parameters. The consumer then transmits an expected order 152 to the transaction system 1. The transaction system 1 stores the expected order for comparison with the order placed on the transaction system 1 by the merchant to ensure that the details of the actual order matches the expected order details. This procedure is consumer driven and so is ideal for mail order 8, transactions over the Internet 12, and telephone shopping 10.

The merchant accesses the transaction system 1 and goes through authentication 154. This ensures that they are an authorized user and the intended party to the transaction. The merchant may seek to validate 156 the identity of the consumer by supplying the consumer's identity code to the transaction system 1. The authentication server 44 of the transaction system 1 is operable to compare the user identification code with those stored by the transaction system 1. This can be used to check that the identity provided by the consumer is correct and that the consumer has passed the registration conditions of the system 1 and is operating within their operational parameters. The merchant may also access the transaction system 1 to validate 158 that the consumer's selected payment means 22-32 are valid for use and not showing as stolen or suspended. The transaction system 1 can process these requests by checking for appropriate status flags stored in the consumer's record and by using the payment server 46 to communicate with the issuing institutions 2a-c of the consumer's payment means to carry out funds available and other standard security checks, as would be known in the art.

The transaction system 1 notifies the consumer of the transaction details recorded on the system by the merchant and gives the consumer an option to reject the transaction or flag up any fraudulent transactions 160. The transaction system 1 also makes referral checks 162 to ensure that the consumer's payment means 22-32 is valid and within the limits set by the consumer's issuer 2a-c and that both consumer and also the merchant are within their operating parameters. Only once the goods or services are ready for dispatch 164 to the consumer is any consumer personal address information 54 released to the merchant by the transaction system 1. After dispatch 164 of the goods or services, the transaction system 1 processes 166 the payment for the goods or services from the consumer's payment issuer 2a-c to the merchant through the merchant's acquiring bank 4. The details of the consumer's payment means 22-32 is never revealed to the merchant, thus ensuring a separation of authentication and payment. The transaction system 1 also provides facilities for control of post sales transactions such as chargebacks 168 and credits 170 utilizing its advantageous authentication facilities.

Figure 8:
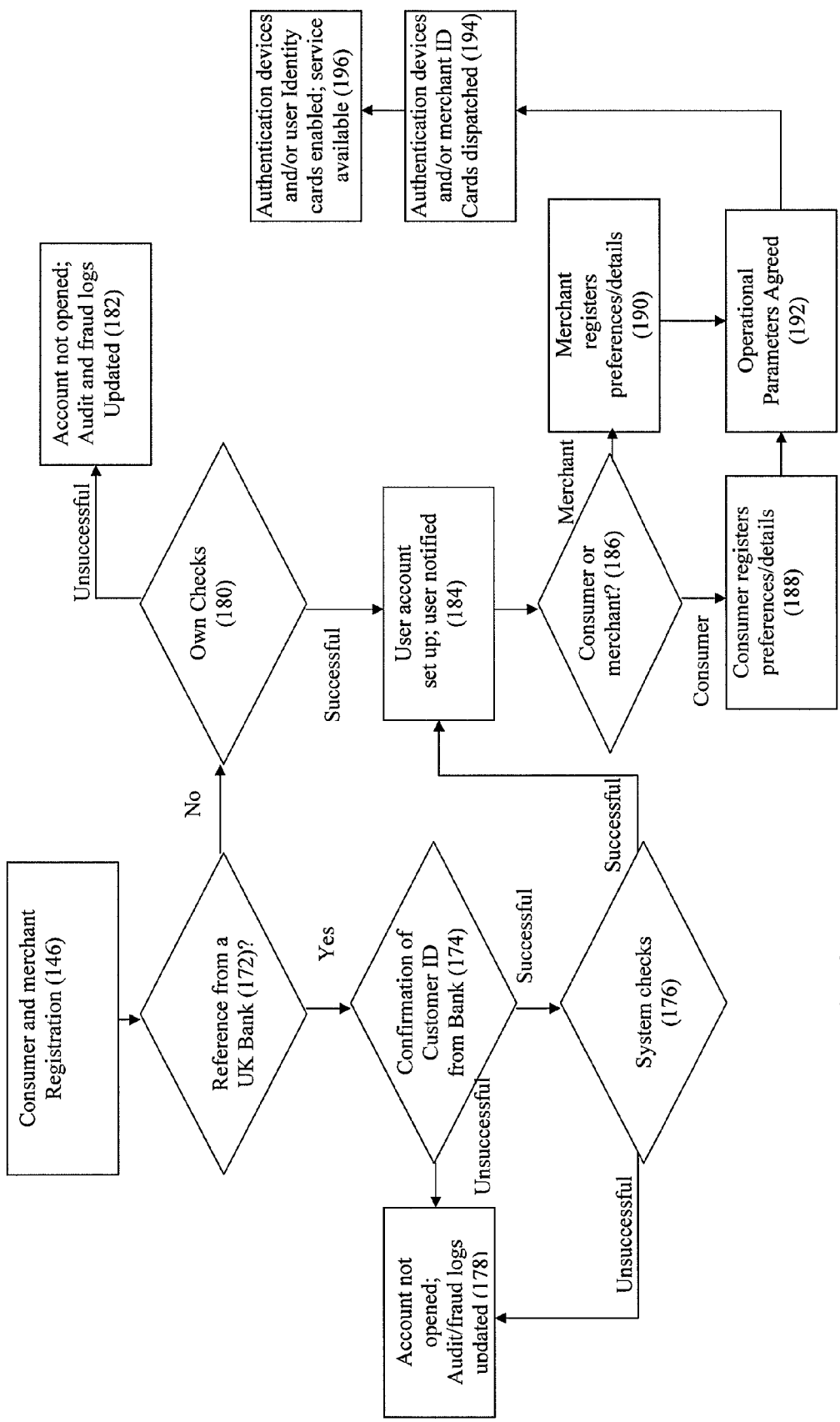
FIG. 8 is a flow diagram of a user registration method.

FIG. 8 shows the registration process 146 in detail. This requires potential users to provide their identities (including name, address and certain payment and banking information) and verify those identities using reliable, independent source documents, data or information. Where the potential user is a business or corporate body, the beneficial owner must be identified and steps taken to verify the identity of the beneficial owner. Details are also required on the purpose and intended nature of the business relationship with the potential user. These may be used to determine the risks associated with each user and to conduct ongoing due diligence on the business relationship and scrutiny of transactions undertaken throughout the course of that relationship to ensure that the transactions being conducted are consistent with the activities of the user, their business and risk profile, including, where necessary, the source of funds. To this end, the transaction system 1 may distinguish between merchants and consumers at all times to help determine the expected activities and incorporate these into risk analysis by determining whether actual usage matches this expected profile.

The preferred method of ensuring the details supplied in the user validation are correct is to obtain a reference 172 from a bank or other sponsoring institution. A potential user may request registration by completing an application form (which may be electronic, such as an Internet form). If the potential user has an existing relationship and is referred by a bank or other institution (retail or otherwise) that requires to follow the same regulatory requirements as the transaction system 1 operator, the prospective user may provide details of the bank as a referee to confirm that the prospective user has undergone the required regulatory checks by that bank or institution. The prospective user must also provide appropriate permission for the transaction system 1 operator to contact the prospective user's clearing bank and to give the bank or institution authorization to release the information required. The bank or sponsoring institution is then contacted 174 to confirm that the prospective user has undergone a consumer validation process that meets regulatory requirements and to confirm that the details supplied by the prospective user are correct. This approach may be enhanced by credit reference agency checks as appropriate.

Where the reference is positive, full application details for the prospective user are assessed 176 to determine whether a service agreement should be granted. Assessment 176 is preferably carried out using underwriting analyses/scorecards as is known in the art. If the reference or subsequent risk analysis is negative, account-opening procedures are not initiated 178 and the outcome is referred back to the prospective user and the sponsoring institution as appropriate. A record of this event is also sent to audit trail logs. If the potential user does not elect to provide a bank reference, then optionally other checks 180 may be employed that depend on local regulatory requirements and system operator policy as would be known in the art. If the other checks are unsuccessful, the audit logs are updated and the account is not opened 182. Where the checks (either via a bank reference or other procedure) are successful 184, the prospective user is notified of the successful application, and a user record is set up 186 as either a consumer record 54 or a merchant record 56. Users are issued with a service agreement setting out their conditions of operating and agreeing initial operating parameters for their account.

Once accepted, the new user provides user and preference details. This can be achieved by: (a) secure access to the system via an Extranet; (b) communication with the service centre staff; (c) via an IVR system; or (d) via written documentation provided through registered postal means. The user and preference details to be provided will vary depending on whether the user is a consumer or a merchant. If the user is a consumer, the details required 188 are: (a) name, address, employment and identity details; (b) details of further consumers who may use the account (e.g. in the case of a household or group account); (c) the method of communication based on specific notifications; and (d) multi-currency transaction base currency. In addition, the consumer has to indicate preferred consumer communication methods, for example, telephone, mobile phone, text message, email address; specific criteria for each communication method preferred, based upon predefined criteria, i.e. which communication formats to use to communicate which events (e.g. account or transaction queries); details of the payment means 22-32 to be used, including card and non-card payment means; unique consumer preferences and operating parameter 60 checks for: specific identity authentication and transaction payment combinations; for each identity/payment combination, preferences for the payment channel 22-32, with identification of default accounts for each channel for faster processing; transaction and gross values over specified periods; payment velocities; and merchant type exclusions or limitations. The system imposes transaction volume, value and velocity limits based on each consumer's application details.

The consumer also has to indicate any preference for trusting transactions if the transaction value in transaction or base currency matches an order that has been pre-loaded by the consumer. Even where this option is selected, the consumer will still be notified of any payment transaction using the consumer's account. The user also has to provide the address details 54 for goods delivery and invoice dispatch to which address codes 76 will be assigned. In addition, the user has to select alphanumeric passwords 78 for Extranet, authentication device 38 and IVR use. Multiple passwords may be selected for different users of an account. An answerback PIN for SMS messages and alphanumeric answerback password for email notifications may also be selected at registration. Where appropriate, an initial password to facilitate authentication device 38 registration of consumer biometric identity means (e.g. fingerprint) will also be registered or generated automatically during registration. Preference over the time delay after which an order is deemed to be an "aged order" and requires to be revalidated and accepted by the consumer may be set and optionally may depend on the payment channel.

At registration, the consumer may also select the level of service. This is principally a choice between an authentication device 38 and identity card 34, which allows triple authentication, or an identity card only 34, which allows dual authentication. For those selecting an authentication device 38, its use can be limited to purchasing items only or for both purchase and sale of items. This feature is advantageous for example for PayPal power sellers or small traders trading under a trusted network. In addition, the user may specify whether or not they wish to transact cash withdrawals in a virtual ATM arrangement. For accounts where more than one user is authorized to use an authentication device 38, each authorized user will select his/her own password, and register his/her unique payment methods, and have his/her own identity card 34. A maximum number of users and identity cards 34 per authentication device 38 is imposed, with payment cards being uniquely linked to specific authentication devices for consumer identity verification and security purposes.

Where an authentication device 38 is selected, the user can select preferred components, e.g. one or more of: GPRS/mobile communications 138; Bluetooth communications 126; 802.11a/b/g Wi-Fi communications 136; USB communications 132; Firewire communications 134; Contactless (RFiD) or NFC communications 130; Wallet capability for contactless payments (where the contactless close proximity channel is selected by the principal consumer); PayPal or small merchant seller functionality. Person-person money transfer capability will be set automatically in accordance with the principal consumer payment type preferences.

At registration, default fulfillment choices should be made regarding the period over which the consumer is prepared to wait during delays in goods dispatch from the merchant, either overall or by transaction channel and merchant type. Mail order will be extended by a default number of days to facilitate postal order timescales but not facsimile or email orders. This will be defaulted to a preset limit based on service arrangements with merchant users. This facilitates notifications from the transaction system 1 to remind the consumer that the default delay period is close to being met. Where no delay is selected, the system will automatically prompt the consumer to acknowledge that goods have been received before allowing transactions to complete.

For registration of a merchant, the details required 190 are name, address, merchant classification and identity details; details of all merchant staff who are to be issued with identity cards 36 (identity cards 36 will be capable of being reallocated to new members of staff as changes occur); and member(s) of merchant staff to be granted authority to change or reset the PIN on identity cards 36. Where more than one member of staff is to use an authentication device 40, the merchant can select the functions to which each member of staff will have access. In this way the merchant can ensure segregation of duties between different parts of the payment process, for example, order input and fulfillment. A maximum number of merchant staff and therefore identity cards 36 per authentication device 40 will be imposed. Preferred merchant communication methods have to be chosen, for example telephone, mobile phone, text message, email address, as do rules for each communication method, based upon predefined criteria (e.g. to use a certain communications route for account notifications or a different communications route for transaction queries or to select which events are to result in notifications).

Details of which payment acceptance methods are to be used, such as card and non-card payment, also have to be defined. Unique merchant preferences can be selected for: payment types, e.g. credit and debit card, accepted across each payment channel, for example face-to-face 6, Internet 12, mail order 8. For each payment channel selected, the merchant can define the estimated values for the numbers of transactions; the gross value of transactions over specified periods; the volume of transactions over specified periods; and exclusions or limitations on specific payment types. The system 1 will impose operational parameters such as transaction volume, value and velocity limits based on each merchant's application details, and will limit specific transaction levels based upon levels of credits, complaints, referrals and other service characteristics. Where delays in dispatch of goods are typical in the merchant's business, the time periods that are typical before dispatch of goods takes place can be specified. These delays will be built into the service agreement with merchants, and monitored by the system.

Other preferences that have to be defined include the method of communication to the merchant in response to specified notification triggers; multi-currency transaction base currency and acceptance of specific currencies elected by consumers using the system. This may be part of a dynamic currency conversion (DCC)/consumer preferred currency (CPC) service provided by the system, as do any preferences for trusting transactions if the transaction value or base currency matches an order that has been pre-loaded by a consumer. Where this option is selected, the merchant will still be notified of payment transactions impacting the merchant account. Alphanumeric passwords for use with Extranet, authentication devices and interactive voice response (IVR) may also be defined, and multiple passwords may be selected for different merchant members of staff. In addition, an answerback PIN for SMS notifications, and an alphanumeric answerback password for email notifications, may be selected. Where appropriate, an initial password to facilitate registration of merchant biometric identity means, e.g. fingerprint, for use with an authentication device 40 is also be registered or generated automatically.

As for the consumer, the merchant can also select the level of service by choosing between authentication using an authentication device 40 and identity card or identity card 36 only. A limited number of identity cards will be provided to merchants, which may or may not be linked to specific authentication devices. For those selecting the authentication device 40, the merchant may elect to use it only for selling items or for both sale of items and providing consumers with cash withdrawal facilities. Also, where an authentication device 40 is selected, the merchant has to indicate whether a Bluetooth enabled base station is required for connection to a fixed telephone line or mobile telecommunications device for communication between the authentication device 40 and the system 1. Authentication device 40 component preferences also have to be included for example: GPRS/mobile communications; Bluetooth communications; 802.11a/b/g Wi-Fi communications; USB communications; Firewire communications, and Contactless (RFiD) or NFC communications (receiver).

The transaction system 1 will determine chargeback reserves according to methods known in the art and provide details of chargeback reserves to be applied as part of the merchant application process.

Once the user's details and preferences are entered, the transaction system 1 determines operational parameters, e.g. according to value, quantity or velocity for each user and records these in the user's record 54, 56. Then authentication devices 38, 40 and/or identity validation cards 34, 26 are issued where applicable by secure delivery. At this state, an identity tag, unique to the authentication device 38,40, is stored either in or in association with the user's record, so that the device is uniquely linked with that user or a designated group of users. Authentication devices 38, 40 and identity cards 34, 36 are only enabled after the user provides a combination of pre-registered personal details and passwords, which have all already been registered, to validate their identity. Where a user only has identity cards 34, 36, contact with the transaction system 1 must be by telephone, IVR or Extranet. Once the user account is enabled, the user is then free to use the transaction system 1 within the terms of their service agreement.

Figure 9:
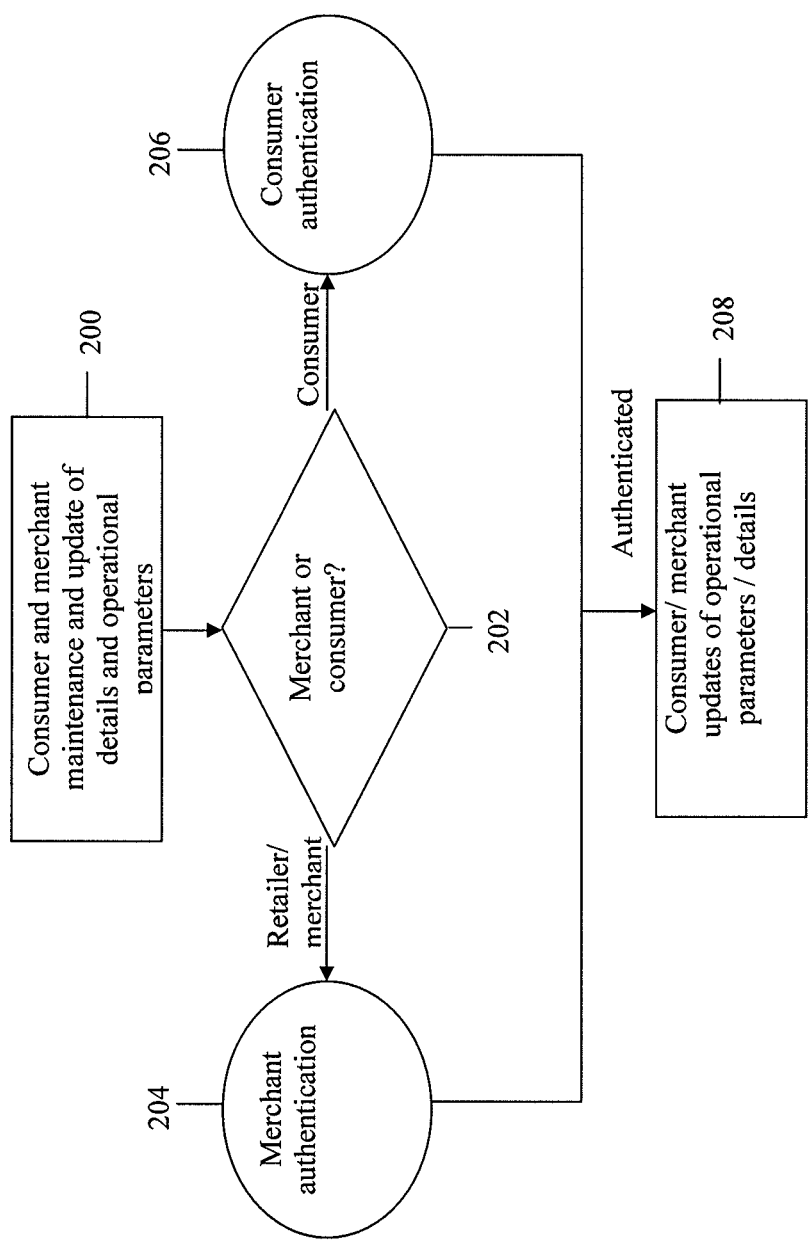
FIG. 9 is a flow diagram of a user maintenance method.

The registration details and operational parameters may be modified using account maintenance as shown in FIG. 9. Each user's record can be accessed 200 for maintenance purposes via any of the communications methods supported by the system such as using an authentication device 38, 40, via telephone to an operator, IVR, Internet/Extranet, e-mail, mobile phone access, e.g. via WAP, i-mode or 3G, text message or RFID link. The user provides their user identity code and the system determines from this whether or not the user is a consumer or a merchant 202. The user then has to be authenticated 204, 206. Access to the account maintenance system is by triple authentication if the user is using an authentication device 38, 40 or double authentication if not using an authentication device as described below. Once the user has been authenticated, they may modify 208 the user's details and those operational parameters 35 that the system 1 allows the user to alter.

Figure 10:
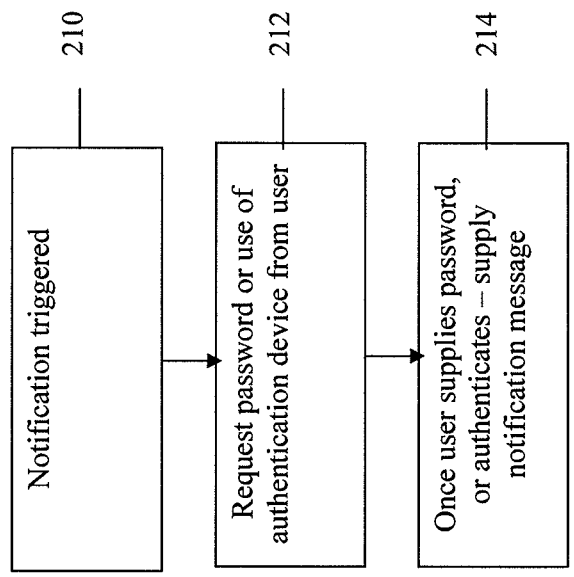
FIG. 10 is a flow diagram of a notification method.

The system maintains a transaction activity logs for recording all transactions made by a user and an audit log for recording any instances where a transaction, registration or access attempt fails or is rejected, orders are rejected by a consumer along with an appropriate reason code, or payment is declined or referred. An expected user behavioral pattern based on information gathered at registration is created. This behavioral pattern is used to determine operational parameters that are agreed with the user. As each user account is used, the transaction data is recorded in the transaction log and audit trail as appropriate in addition to other data as supplied by the issuers 2a-c of payment cards or other payment means to monitor the behavior of the users. The user's credit and fraud risk is calculated periodically and/or upon transactions being made by methods known in the art to provide a constant assessment of risk to the transaction system 1 operator. As shown in FIG. 10, a notification system is provided with trigger events set to provide user information or communication, or provide a warning when operational parameters are breached or the system determines that the credit or fraud risk is too high.

The form of notification may be specified by the user at registration or during account maintenance. It may be any notification type known in the art, but is preferably an SMS message, a message sent to and displayed on an authentication device 38, 40, an e-mail or a telephone call from an operator. When an event triggers a notification, a message is sent to the user 210. To ensure that the user receives the notification and not a third party, the user will be required either (a) to respond to an SMS message with a predefined password set at registration before the notification is sent; or (b) will be referred to a link by email which will transfer the consumer to a secure Extranet facility which will require validation by password or authentication device 140 set at registration 212. Once the user has been verified, the notification is accessed 214.

Figure 11:
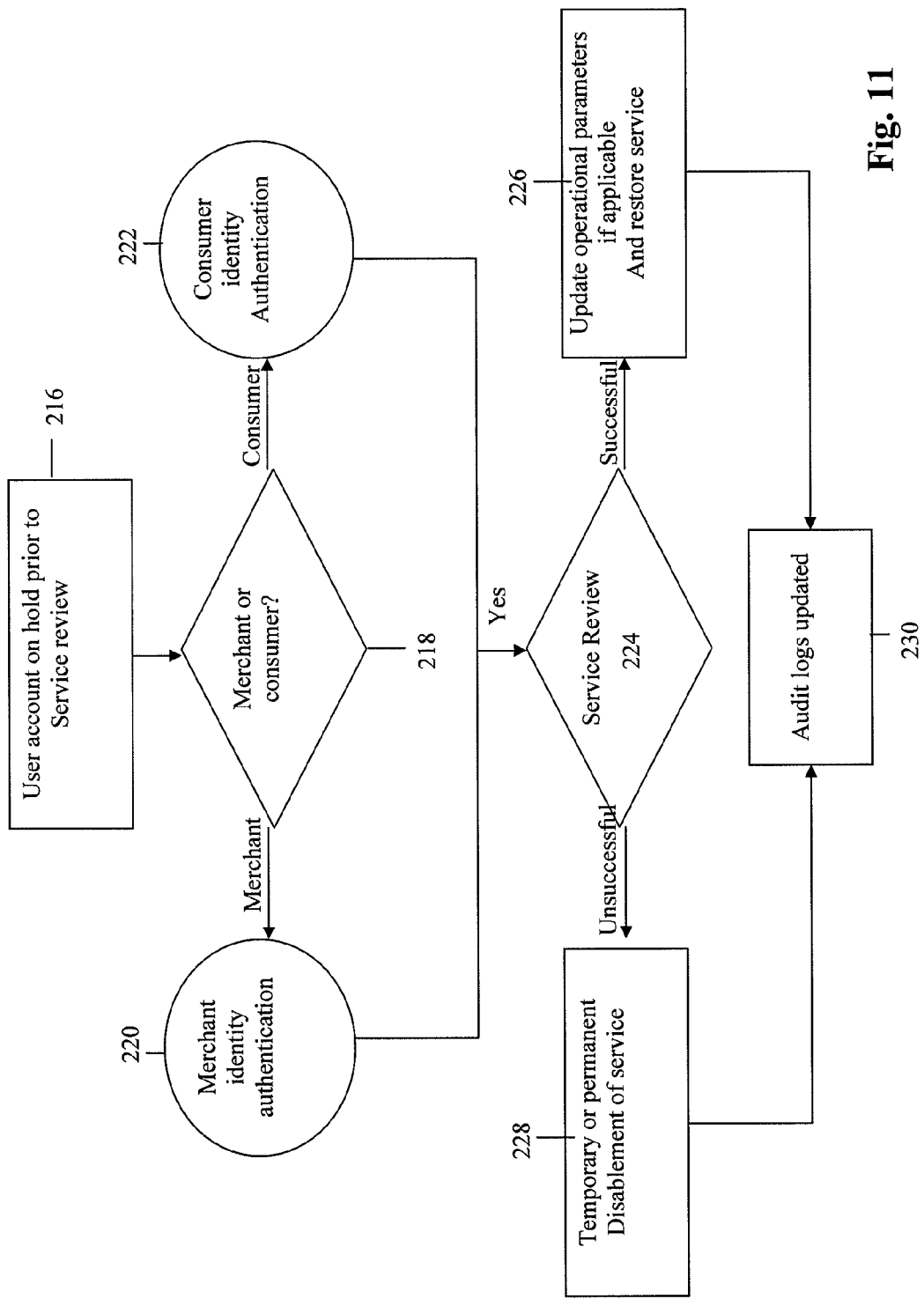
FIG. 11 is a flow diagram of a user service review method.

Each user account is assigned notification triggers in response to operational parameter breaches that are used to control risk and to flag up any operations that are out with the service agreed during the registration, maintenance or review processes. Grace limits above transaction limits are set to create shadow limits, which act as a buffer against any minor breach of the transaction limits. Consumer accounts are reviewed periodically and/or when a transaction is made. If a consumer is: (a) in breach of its transaction limits (over and above any shadow limit); or (b) where the system has detected an unusual or suspicious transaction, the system will lock the user account by recording a "hold" flag on the user's account such that the user will be unable to use the system for any purpose, including validation of the consumer identity to third parties, until it has undertaken a service review, as shown in FIG. 11.

A service review involves a user contacting an operator to discuss the problem 216. Before discussing the problem, the user supplies their identity code from which it can be determined if the user is a consumer or merchant 218. The user then validates their identity 220, 222 using triple authentication if using an authentication device 38, 40 or double authentication if not using an authentication device 38, 40 as described below. If the authentication is successful, a service review is commenced 224. The operator may agree a change in the user's service agreement or operational parameters 35. Where satisfactory arrangements are agreed between the operator and the consumer 226, for example an increase in transaction limits if appropriate, the user's account is updated accordingly and the "hold" flag is removed from the user's account such that the user may use the system again. Where appropriate arrangements are not reached 228 with an operator, the operator may, according to predefined criteria, keep the "hold" flag on the consumer's account until settlement and satisfaction of the service agreement; or permanently disable the consumer's account. Details of the limit breach and subsequent interaction are recorded in the audit logs 230.

The authentication procedure depends on whether the user is using an authentication device or not and whether or not the user is a consumer or a merchant. If an authentication device is used, then the user must triple authenticate their identity. If authentication is carried out without an authentication device, then the user must double authenticate their identity. Alternately, the method for authentication without use of an authentication device can be used as a backup only when the authentication device(s) are unavailable or incapacitated. Regardless of the authentication method used, personal details of the consumer, such as payment details, are not communicated to the merchant, thereby significantly reducing the possibility of identity theft, theft of payment details and/or payment fraud. Only after both parties are authenticated as being recognized and trusted users can payment processing proceed.

Figure 12:
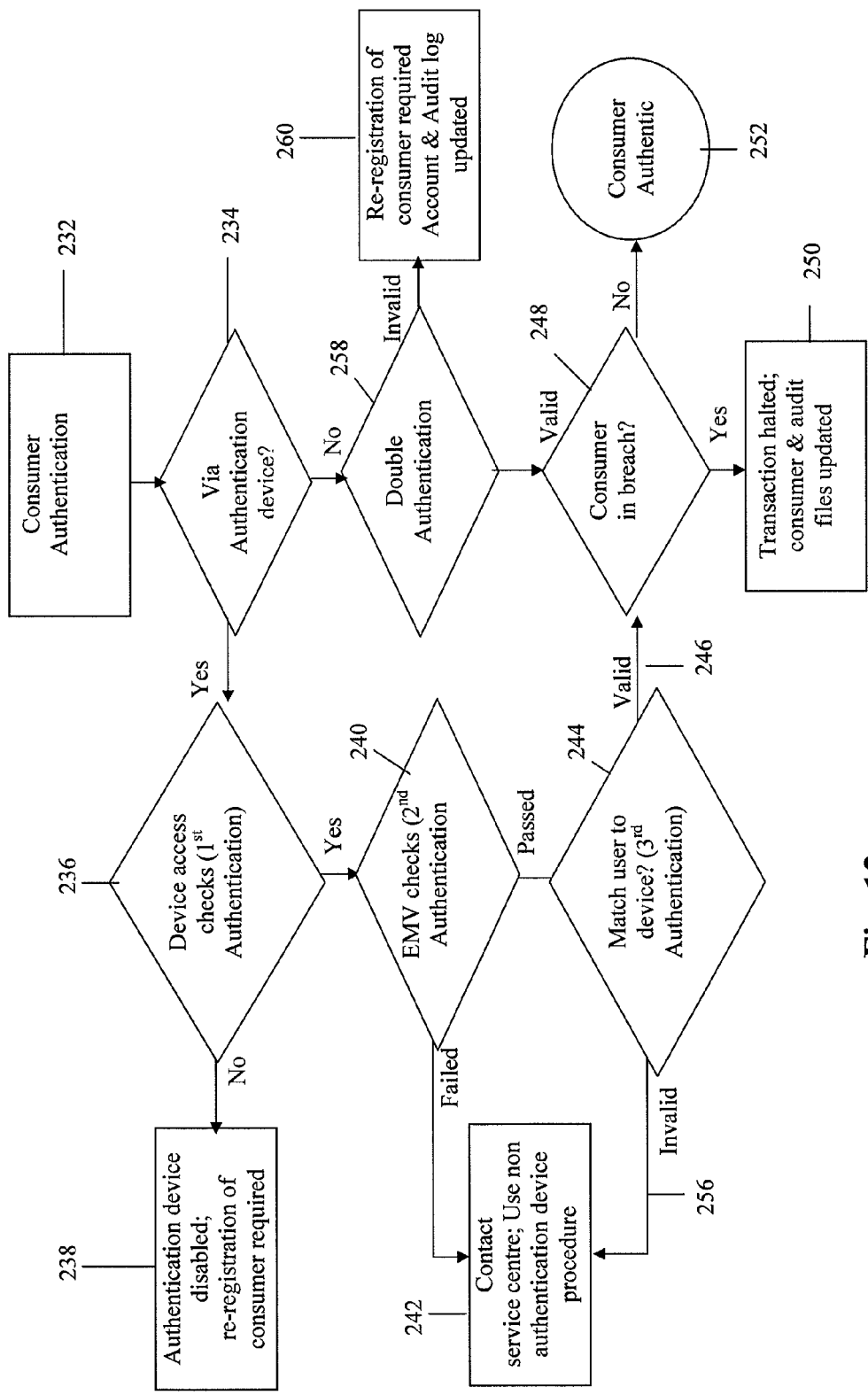
FIG. 12 is a flow diagram of a method for authenticating a user.

As shown in FIG. 12, the first step is to identify whether the user is a consumer 232, and if yes, whether an authentication device is to be used 234. If the user is a consumer and authentication is to be carried out using an authentication device, the consumer firstly validates his/her permission to use the authentication device 236. This primary validation takes place locally (offline), between the consumer and the authentication device, representing the first authentication of a multi-stage authentication approach to validating the right of the consumer to use the authentication device in their possession. For those markets or regulatory environments that require online verification, the service will connect the relevant issuing institution through the system 1 to the authentication device. The primary validation is by entry of a relevant multi-digit PIN and/or alphanumeric security code and/or biometric authentication, employing a combination of encryption/authentication standards, biometric recognition and 128-bit encryption methods, such as secure socket layers (SSL). Where a PIN is used, the PIN is mutually exclusive to any PIN associated with the consumer's credit, debit, charge or prepaid cards, or other payment means. The consumer may change the PIN, alphanumeric security code, or biometric authentication method at any time through use of the maintenance process described above with reference to FIG. 9, which is accessed via the authentication device or through secure access to the consumer's account maintenance facilities via an Extranet. Both offline and online security codes and, where utilized, biometrics can be maintained using this facility.

If the consumer fails 238 to validate his/her permission to use the authentication device after three successive entry failures of a PIN, alphanumeric entry code or biometric parameter, the authentication device will be automatically disabled for entry of further details. The consumer will be required to contact a system operator to have his/her authentication device unlocked and reset, and may be required to reregister his/her security details on the authentication device and with the system operator or system 1, via, e.g. Extranet or IVR. Where the consumer wishes to use the system 1 before his/her authentication device is unlocked and reset, the consumer will "fallback" to using the authentication system 1 without an authentication device as described below.

Secondary authentication 240 is performed either on-line by using the authentication device to connect with the authentication server 10 or off-line. For authentication in response to Internet or on-line transactions, links to this step of the validation may be provided within a merchant's web page. On-line authentication is the preferred approach, as this provides the most secure approach by allowing access to the most recently available data. On-line authentication can be achieved by firstly using the authentication device to connect to the authentication server 10 by Internet Protocol (IP) using one of (a) USB; (b) Firewire; (c) 802.11a/b/g wireless ("Wi-Fi"); or (d) Bluetooth connectivity, and employing secure encryption techniques such as key encryption or secure socket layers (SSL). Alternatively, connection can be achieved by using mobile telephony services such as GPRS and 3G to communicate securely with the authentication server 10. These approaches combat anti-phishing and anti-fraud screen capture measures, providing increased security. The authentication device can also be dynamically set to require regular on-line authentication, which further enhances identity and payment security. The mobile telephony service can also be used contemporaneously with Internet access, providing a further security benefit.

The secondary authentication 240 of the consumer involves verifying consumer identity or payment card(s) employing chip and PIN and compliant with the Europay MasterCard Visa (EMV) validation standards using the EMV compliant chip reader 124 within the authentication device 38. Any card used must be registered with the system 1 during registration of the account or using the account maintenance procedure. The card details are then compared with the details held within the consumer's user record 54. User identity cards may be any card satisfying EMV chip and PIN standards such as specific user identity cards issued by the transaction system 1 operator or debit, credit, charge or prepaid cards. Where a card is not used to verify a consumer identity, the consumer may elect to use a secondary on-line PIN and/or alphanumeric security code and/or password and/or biometric, which will be encrypted and matched against a PIN and/or alphanumeric security code and/or password and/or biometric identity which is pre-registered during registration or account maintenance. If the user fails the secondary authentication, contact with the service operator is required 242.

In the event that the secondary authentication step is successful, the third and final authentication step is commenced 244. This is facilitated by matching the authentication device identity tag, unique to the authentication device, with the cards, security codes, password and/or biometric combination linked specifically to named consumers and held securely online on the central transaction system 1. The users allowed to use an authentication device are specified during registration or account maintenance. Individual consumers are validated against a unique authentication device tag if the authentication device is assigned to a sole user. If multi-user accounts are operated using one or more authentication devices, validation is achieved by checking for a matching authentication device tag/account holder user identity card combination as well as the multi-user identification/authentication device tag combinations.

Where the consumer details are matched to the correct authentication device 246, a check is done to see whether the consumer is in breach of any operating parameters 248. If yes, the transaction is halted and the audit files up-dated 250. If no, the consumer is fully authenticated and the transaction continues 252. In contrast, where failure to match the consumer's details occurs 256, for example, due to incorrect entry or non-match of password, code, chip and PIN card details, biometric or authentication device identity tag, the consumer is halted from further transacting using the authentication device. The consumer will then have to use the account maintenance service or contact an operator to restore use of the authentication device, or to transact by using the non-authentication device procedure described below. In all cases, the transaction history of the user associated with the authentication device is updated with details of invalid consumer transactions.

Optionally, for face-to-face transactions, the consumer may be authenticated using a merchant's authentication device. This process involves the merchant triple authenticating themselves as described below. Once the merchant has successfully authenticated its identity, the merchant will pass the authentication device to the consumer for the consumer to authenticate their identity online. The consumer will be prompted to enter their identification code and PIN code and/or security code and/or biometric identifier. If these are valid, this will be confirmed by an acknowledgement message being sent to the authentication device from the authentication server 10, facilitating the next step in the transaction process. If the consumer fails this first step in authenticating their identity by three successive entry failures of a PIN, alphanumeric entry code or biometric, processing of further order details will be halted. The consumer will be required to contact the operator, and may be required to reregister their security details. The invalid user identity code is transferred to the audit trail logs by the authentication server 10, and the transaction history of the merchant account associated with the authentication device is updated with details of invalid consumer transactions.

Where the first authentication step is concluded successfully, the consumer dual authenticates their identity using a registered EMV certified card (whether credit, debit, charge, prepaid or user identification card) and PIN. In addition, the authentication server 10 sends an on line challenge for third stage authentication by the consumer, based either on a further EMV certified payment card if one is registered to the consumer's account (e.g. where a user identification card was first used) or on the basis of pre-registered personal details or transaction histories. In this way, the consumer needs at least to dual authenticate himself using the merchant's authentication device before proceeding with a transaction. Where a consumer fails identity validation after three failed attempts at dual or tertiary identification, the authentication server 10 sends an appropriate referral message to the authentication device, requesting the consumer either to use another registered EMV card/PIN combination or to contact an operator. Where the consumer has no further registered cards or after a failure of three attempted EMV card/PIN combination entries, processing will be halted as a security measure. No further activity will be allowed for that consumer using the card/PIN combinations used against that authentication device. Transaction processing will be halted, and the appropriate merchant and consumer event and anti-fraud audit logs will be updated.

Where an authentication device is not used, a dual authentication procedure 258 can be used by (a) interacting with an operator by telephone after security validation is attained; (b) logging into the Extranet which will require at least dual authentication secure access, and validation and navigation capabilities as generally used for financial web sites, employing secure encryption techniques for transaction processing; or (c) interacting with the IVR service. Primary authentication is achieved by providing a user specific password and/or security details and/or PIN. Where there are multiple users of a consumer account, the password and/or security details and/or PIN is specific to the member of staff or individual user to enable accountability. Secondary authentication is carried out using various authentication checks. These may include questions based on registration details or transaction histories. The authentication checks used are dynamically varied, for example, according to an analytical algorithm to achieve best selection of questions to provide maximum security. If the consumer fails authentication, re-validation of their identity is required through interaction with an operator 260. The consumer cannot then process transactions until their registered identity details have been re-validated by the operator. The consumer account and audit logs are updated with the details of the failed authentication attempt. Where a consumer passes identity validation, the process proceeds as before 248-256.

Where the user is a merchant, the merchant registers staff members as authorized users and assigns EMV compliant user identity cards, user accounts and user PINs, passwords and/or biometric identifiers to the members of staff. The permissions on each member of staff's user account may be selected upon registration or maintenance such that each staff member has access rights and ability to use only the features of the system necessary to do their job. In this way, the merchant can control and segregate duties between staff members and control exposure to erroneous transactions, mistakes, staff acting out with their authorized area and fraud. The merchant may also specify that authentication is carried out with an authentication device using triple authentication or without an authentication device requiring double authentication.

Figure 13:
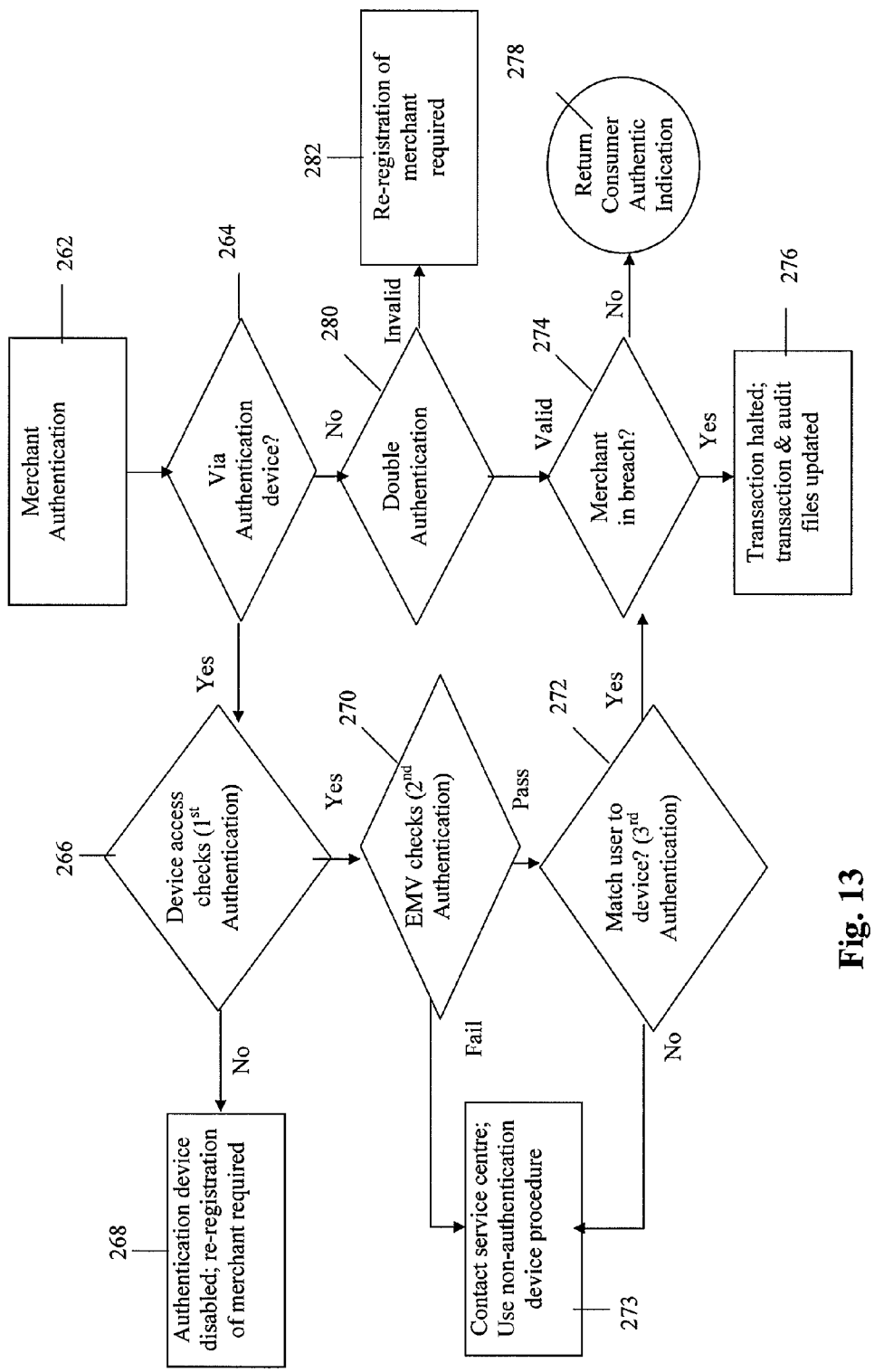
FIG. 13 is a flow diagram of a method for triple authenticating a merchant.

FIG. 13 shows the process for authenticating a merchant 262. If the merchant staff member is authenticating using an authentication device 264, the staff member firstly authenticates their identity offline by entry into the device 266 of a relevant multi-digit PIN, alphanumeric security code or biometric authentication, employing a combination of EMV authentication technology (e.g. chip and PIN), biometric recognition and 128-bit encryption methods as generally available. Where a PIN is used, the PIN is mutually exclusive to any PIN associated with any merchant's or staff member's identity or merchant personal EMV compliant cards. One or more authentication devices may be uniquely linked to one or more authorized members of merchant staff.

The list of staff members authorized to use an authentication device may be updated using the account maintenance facilities. Updated user lists are communicated to the authentication device 40 from the authentication server 44 via an appropriate communications channel such as an Extranet, GPRS, Wi-Fi, 3G mobile communications, etc. Authentication is achieved by comparing the identity as indicated by the identity card and associated PIN, security code, etc. with the list of valid users stored on the authentication device. The merchant may change the PIN, alphanumeric security code, or biometric authentication method at any time through use of the maintenance facility using the authentication device directly or through secure access to the merchant account maintenance facilities via the Extranet. Both offline and online security codes and, where utilized, biometrics can be maintained using this facility. Validation of the merchant identity with the authentication device is a prerequisite to transacting using the authentication device.

If the merchant member of staff fails to validate their identity 268 after three successive entry failures of a PIN, alphanumeric entry code or biometric, the authentication device will be automatically disabled for entry of further details as a security measure. The merchant will be required to call an operator to have its authentication device unlocked and reset, and may be required to reregister its security details on the authentication device and on the authentication server 44. No further transactions can be processed using the authentication device 40 until it is unlocked, and potentially re-registration has taken place. Similar restrictions apply whether or not a merchant has a single or multiple users of an authentication device 40. Where the merchant wishes to use the service in the event that an authentication device is locked, the merchant may fallback to using the authentication service without an authentication device 40 as described below.

If the merchant member of staff successfully completes the first authentication step, the staff member must then carry out two more stages 270, 272 to authenticate their identity. The staff member does this by firstly 270 using the authentication device to connect with the authentication server 10. This can be achieved by connecting by Internet Protocol (IP) as a transport for transactions generated by the authentication device using one of (a) USB; (b) Firewire; (c) 802.11a/b/g wireless; or (d) Bluetooth connectivity, as generally available, and employing secure encryption techniques such as key encryption and SSL. Alternatively, connection can be achieved using mobile telephony services (e.g. GPRS, 3G) as generally available, to communicate securely with the authentication server 44. Both approaches include anti-phishing and anti-fraud screen capture measures as are known in the art. The mobile telephony service can also be used contemporaneously for Internet (IP) access, providing a further security benefit for merchants in countering identity theft and payment fraud.

Secondary authentication 270 of the merchant staff member is thereafter facilitated by verifying merchant staff member identity card(s) employing EMV compliant chip and PIN validation techniques against the EMV compliant chip reader within the authentication device. Any identity cards used must be registered and match details held within the merchant's account. Other cards that satisfy EMV chip and PIN standards and common criteria could be used (e.g. specific to merchant) but would require to be registered and validated to maintain security levels. In the event that the merchant fails this stage, they are required to contact the service operator 273. In the event that the merchant passes this stage, they move onto to third authentication stage, 272. This is facilitated by matching the identity tag unique to the authentication device with the cards, security codes, password and/or biometric combination used by the merchant member of staff and held securely online on the transaction system 1. This is a further unique security aspect, requiring merchant PINs, security codes, passwords, card identity details, and authentication devices identity tags to be linked specifically to named merchants and pre-registered staff held and registered on the transaction system 1. As before, if the merchant fails this stage, they are required to contact the service operator 273. Otherwise, they move onto the next stage 274. This involves a check of whether the merchant is in breach of its operating parameters and/or agreed service limits. If yes, the transaction is halted and the transaction and audit files updated 276. If no, then the transaction proceeds 278.

In an optional embodiment, for face-to-face transactions the merchant or merchant staff member may be authenticated using a consumer's authentication device. All parties must be registered users of the service. In this process, the consumer is firstly authenticated as described above. Once successfully authenticated, the consumer is instructed via instructions displayed on the authentication device to pass the device to the merchant member of staff. The merchant member of staff then inserts their identity card into the consumer's authentication device. Primary authentication is achieved utilizing EMV authentication standards such as chip and pin. Secondary authentication is via the input of a pass code or 2nd PIN and optionally answering of appropriate dynamically selected challenge questions selected according to an analytical algorithm. Authentication is carried out online, thereby increasing the security of the authentication process. Individual merchant staff are separately identified by specific identity cards and pass codes or PINs that are unique to the member of staff.

If a merchant fails authentication during secondary or tertiary authentication (e.g. invalid identity, invalid pass code or security details), merchant re-registration will be required, through merchant interaction with an operator. The merchant member of staff involved cannot process transactions until their registered identity details have been revalidated. In instances where validation fails, requiring re-registration, two further merchant staff with appropriate access capabilities may attempt validation, in which case the process is repeated with a different merchant member of staff using a different identity card and pass code. If other members of staff do not have appropriate access permissions, processing will halt, and the audit logs will be updated with the details of the transaction. Communication of the authentication failure to the consumer is the responsibility of the merchant, as the operator will not be aware of the consumer's order being received by the merchant. If consumers contact the operator with details of the merchant, the operator can investigate the rejection.

Where an authentication device is not used, a dual authentication procedure is used 280 by (a) interacting with an operator by telephone after security validation is attained; (b) logging into the Extranet which will require at least dual authentication secure access, and validation and navigation capabilities as generally used for financial web sites, employing secure encryption techniques for transaction processing; or (c) interacting with the IVR service. Primary authentication is achieved by providing a user specific password and/or security details and/or PIN. Where the user is a merchant staff member or where there are multiple users of a consumer account, the password and/or security details and/or PIN is specific to the member of staff or individual user to enable accountability. Secondary authentication is carried out using various authentication checks. These may include questions based on registration details or transaction histories. The authentication checks used are dynamically varied, for example, according to an analytical algorithm to achieve best selection of questions to provide maximum security. If the merchant fails authentication 282 (e.g. invalid user identity, invalid password or security details), they are required to re-validate their identity through interaction with an operator. The staff member cannot then process transactions until their registered identity details have been re-validated by the operator. The merchant account and audit logs are updated with the details of the failed authentication attempt. If the merchant passes authentication, then the procedure is as before 274-278.

Figure 14:
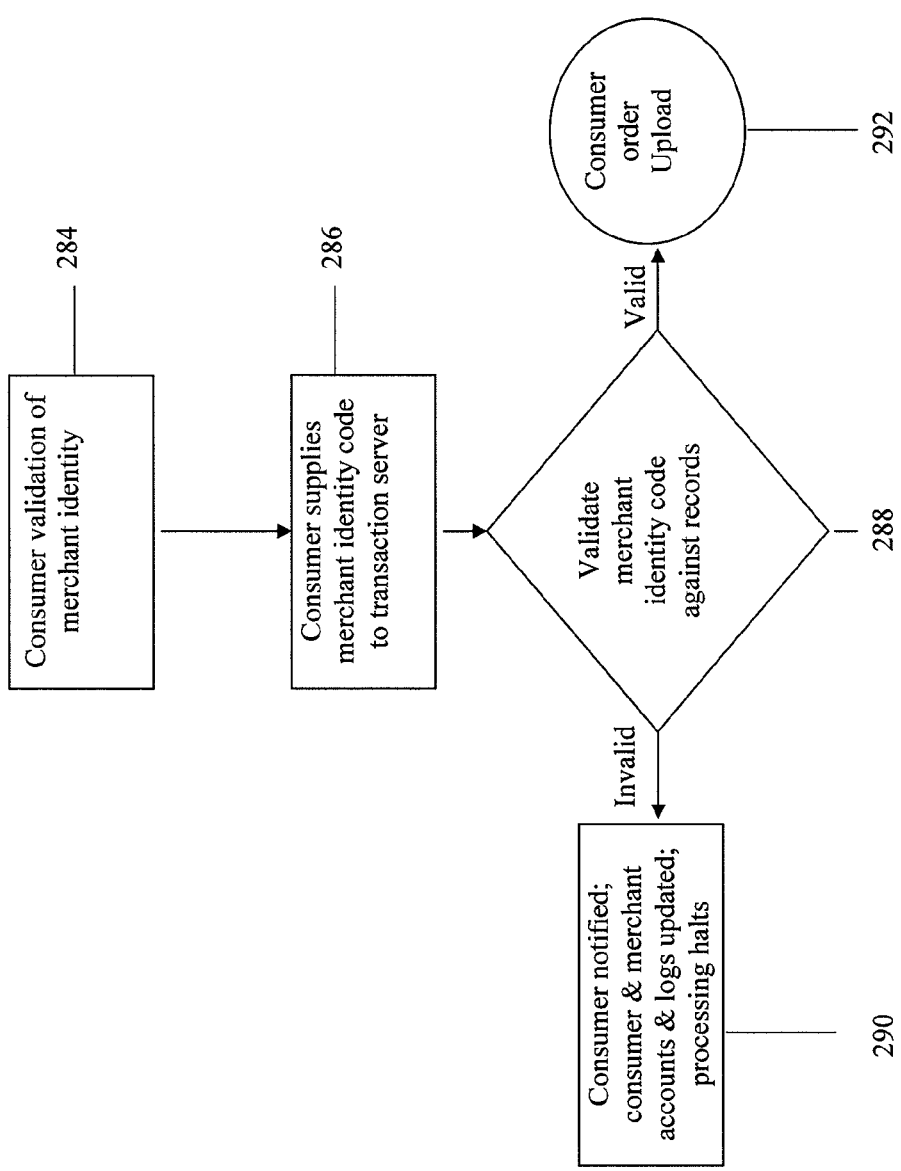
FIG. 14 is a flow diagram of a method for validating a merchant's identity.

FIG. 14 shows a process for pre-order validation of a merchant's identity. This allows the consumer to establish if a merchant is a valid, trusted user that is currently transacting within its authorized service agreement. This affords the consumer a significantly increased level of confidence and security in transacting with merchants of whom the consumer has previously had no experience. In some transaction types, for example face-to-face purchases, it is less likely that the user will want to pre-validate the merchant's identity, as purchases are generally made on impulse. However, this feature may still be useful when purchasing high value items such as jewellery, high value electrical goods, cars or furniture, or the goods are purchased face-to-face but delivered later.

To facilitate validation of a merchant's identity 284, the merchant supplies the consumer with the merchant's identity code 286, which may be displayed on, for example, the merchant's web page, in a shop, in a catalogue, promotional literature or communicated by sales staff over a phone line or face-to-face. To pre-validate the merchant, the consumer transmits the merchant's identity code to the authentication server 10. The merchant identity code is then checked against valid, active merchant user records held on the transaction system 288. Where the merchant identity is found to be invalid or suspended, the consumer will be informed/alerted 290. The consumer and, where appropriate, merchant accounts will be updated accordingly, as will the appropriate audit trail log files. Until a valid merchant identity is authenticated and acknowledged, the consumer takes no further action. Interaction between the consumer and an operator may take place to investigate the invalid merchant details. Where the merchant identity is found to be valid, the consumer will be informed/alerted 292 and the transaction can proceed.

Once the merchant has been validated as genuine and operating within its service agreement, the order may be logged with the transaction system 1. Logging details of an expected order with the transaction system 1 before placing the order with the merchant allows the expected order to be cross-checked against the order the merchant actually processes.

The consumer firstly selects which payment means they wish to use in the transaction. Once the transaction server 1 matches the transactions supplied by the consumer and the merchant, the payment server of the transaction system 1 uses the specified payment means to effect payment to the merchant. No details of the payment means are ever communicated to the merchant. Thus, not only is the method of payment distinct and mutually exclusive from the method of achieving identity verification but unlike existing payment methods, no source payment account details are ultimately available to the merchant, enhancing identity and payment security for consumers. As an extra security feature, each payment account can be stipulated for use only with certain transaction types, e.g. mail, telephone, face to face or Internet order and for other transaction parameters such as use only with certain merchants and/or transactions up to a certain limit and/or for certain types of goods, etc.

During registration certain accounts may be selected as default accounts for certain transactions. For example, the consumer may specify that a particular credit card be used for all Internet based transactions, and a particular debit card be used for all person-to-person transactions. Alternatively, a single account may be specified for all transactions. In any case, default accounts, where registered, may be confirmed or overridden only with other previously registered accounts, providing further security. Where the consumer wishes to override pre-selected default accounts, a secondary password/security code is required if an authentication device is not used, such as when using telephone, IVR or Extranet. Where an authentication device is used, non-default over-ride accounts, whether card or non-card, can only be selected after online verification of an override PIN, alphanumeric code or biometric. The authorization server will prompt for confirmation of selected non-default over-ride accounts. Only previously registered accounts may be selected in favor of default accounts. Where an over-ride account selection fails verification, the consumer is notified in accordance with their preferences, and the system falls back to the default account choices previously registered.

Where no default accounts have been previously registered, the consumer may register a new account through the maintenance facilities, which will result in processing of the order being halted until this is done. Where a valid, pre-registered default or over-ride account is selected and confirmed, the transaction value, an address code selected from those updated during consumer registration or maintenance, and an optional narrative description of the goods are supplied to complete the order pre-validation. At this point, both consumer and merchant accounts are updated for the order, within an "awaiting order" status.

The order data stored against a consumer record is compared to any subsequent order lodged by the merchant upon order fulfillment. Unless any subsequent order logged by a merchant matches the order details provided by the consumer, the transaction will be placed on hold and both consumer and merchant notified. It is then up to the consumer and merchant to rectify the discrepancy as appropriate. The transaction will remain on hold until released by the consumer. This provides extra confidence to the consumer that any orders match the requirements of the consumer before any payment is made and lowers the cost of returns and minimizes complaints rates for merchants. This procedure may be waived in certain retail situations such as face-to-face purchases where the goods are generally provided instantly to the consumer. However, even in these cases, this procedure may still be used in appropriate situations, for example, if the goods are ordered face-to-face but delivered or supplied later.

As noted previously, the placement of orders by consumers can be made using a range of transaction types, e.g. mail order, telephone order, face-to-face or Internet order. Regardless of the transaction type, the consumer generally orders goods by validating the merchant's identity, and authenticating themselves as described above. Then details of an expected order are logged and the order is placed. Communication with the transaction system 10 may be via any of the communications routes described previously, for example by using an authentication device, Extranet, via telephone to an operator or IVR, mobile communications such as WAP, 3G or i-mode or by Wi-Fi. However, regardless of the transaction type or communication channel used, because of the basic principle of separation of authentication and payment, the same security levels can be applied across all payment channels.

Figure 15:
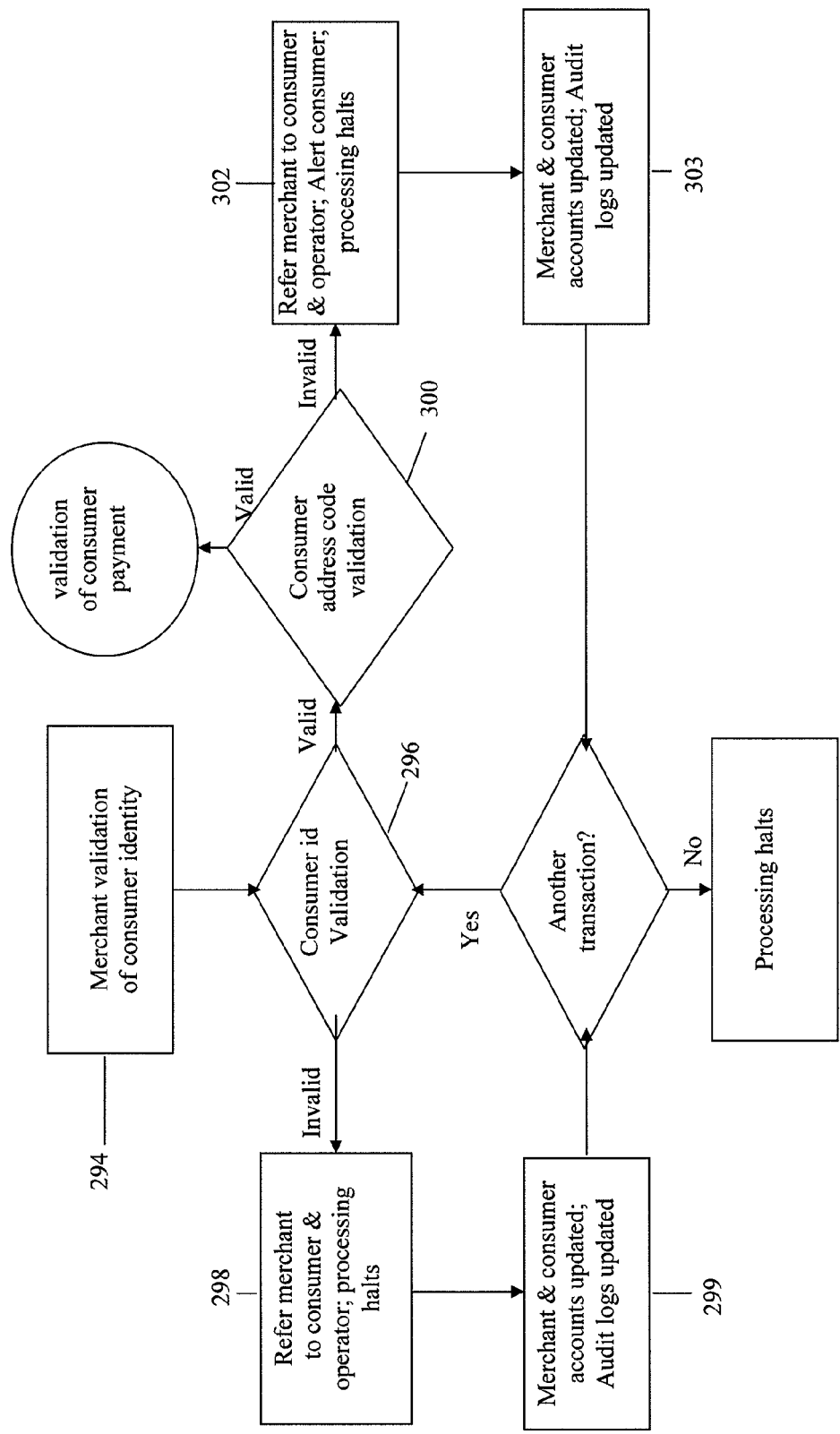
FIG. 15 is a flow diagram of a method for validating a consumer's identity.

Once the merchant receives the consumer's order, the merchant may process the order by accessing the transaction system 1 using one of the communications methods such as using an authentication device, Extranet, by telephone to an operator or IVR or mobile communications. Thereafter, the merchant is required to authenticate their identity using triple authentication if an authentication device is being used or by double authentication otherwise, as described above. After the merchant identity is authenticated, to access the system, the merchant must then validate the consumer's identity and address codes, as shown in FIG. 15. This feature serves to reduce the levels of consumer identity theft and gives the merchant an increased level of confidence in transacting with consumers of whom the merchant has no previous experience. The merchant carries out consumer identity and address validation by interacting with (a) the operator by telephone; (b) the Extranet secure processing service (utilizing SSL 128-bit security encryption or better as generally available); (c) the IVR (Integrated Voice Response) service, to provide details by voice or by using the telephone keypad; or (d) a valid authentication device 40 to enter details. Merchants using the Extranet system will require to use a selection of mouse selection, alphanumeric character recognition and different web pages to improve security. The merchant may use the authentication device 40 as an input device to send encrypted data using generally available mobile telephony services to the transaction system 1 and gain acknowledgement in return.

FIG. 15 shows part of the order process, which serves to validate the consumer 294. The merchant obtains an identity code and an address code from the consumer. The merchant communicates the consumer identity code to the authentication server 296. The authentication server checks the consumer identity code against the user records on the storage media and returns an indication of whether or not the consumer identity is valid. If the consumer identity code entered by the merchant is invalid and fails a pre-specified number of repeated attempts at entry validation, the order entry transaction halts and the merchant is referred back to the consumer with the option of receiving further details by contacting an operator 298. The transaction logs of both the consumer and merchant are updated along with the consumer and merchant audit logs 299. Progress to the next stage of input of the address code is dependent upon successful validation of the consumer identity code.

Where the consumer identity is valid, the address code can then be communicated to the authentication server 300. The authentication server checks that the supplied address code matches an address code stored in the consumer's user record. If the address code is invalid (i.e. does not match a stored address code) and remains invalid after failing a pre-specified number of repeated attempts at entry validation, the authentication server will refer the transaction back to the merchant and additionally alerts the consumer using the preferred notification route recorded on the consumer's user record 302. If either the consumer identity code or the address code is invalid, the invalid consumer details are transferred to the anti-fraud audit trail logs 303. The merchant account transaction history is updated with details of the invalid consumer transactions with appropriate status codes. The consumer account transaction history is also updated. If the merchant is processing multiple consumer orders, processing will flow to the next consumer identity transaction.

Optionally, in some circumstances, the consumer can upload their order details onto the transaction system 1. If the consumer does this, the transaction system 1 matches the consumer identity code, address code and merchant identity code to those supplied in the preloaded details in order to further validate the order and merchant identity during initial order processing. The matching of consumer and merchant transactions is an improved counter-fraud security validation check. Where the matches are valid, processing moves to the validation of the consumer payment details.

Figure 16:
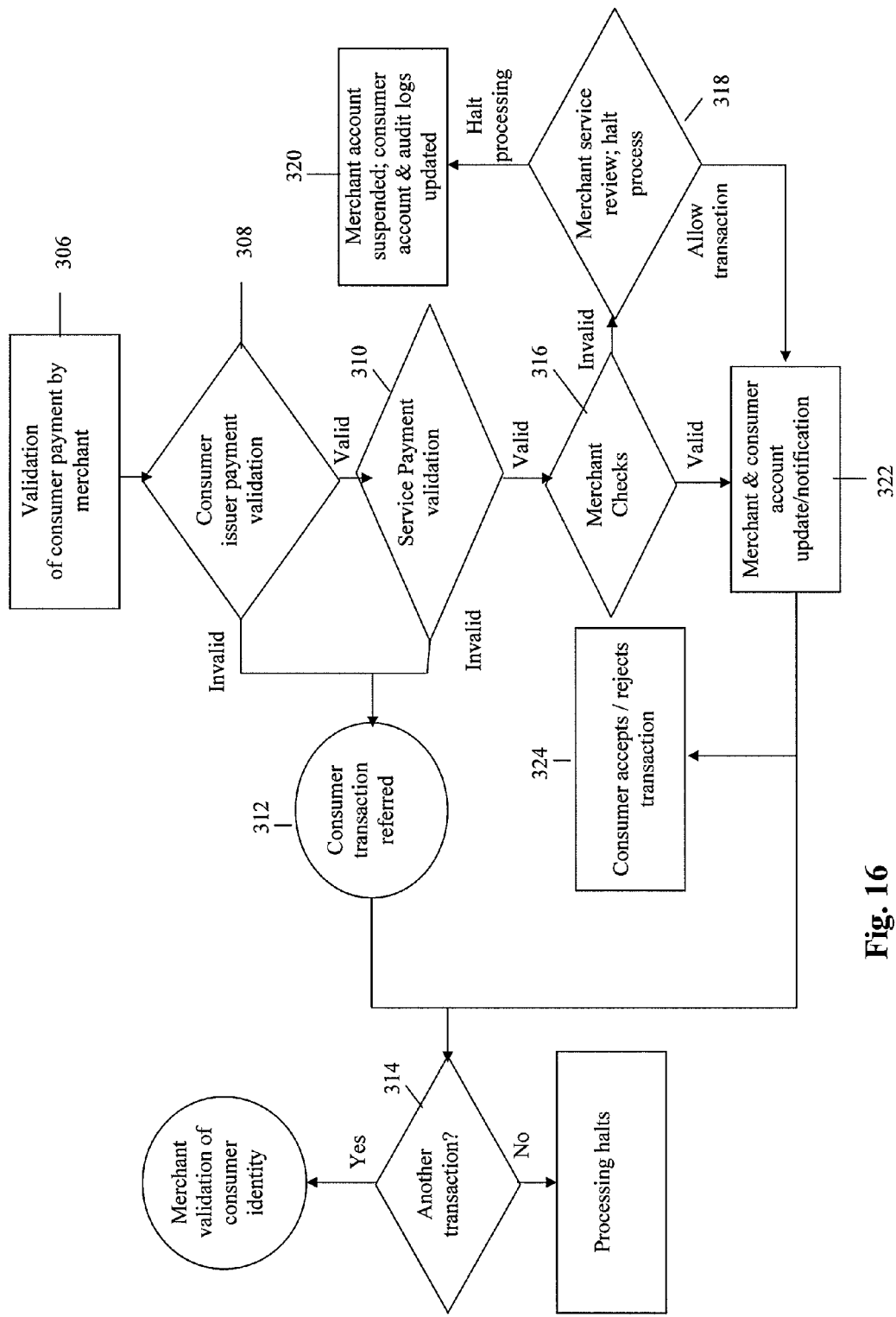
FIG. 16 is a flow diagram of a method for validating a consumer's payment ability.

FIG. 16 shows a process for validating consumer payments. This allows the merchant to pre-check the consumer's ability to pay and is transacting normally. Validation of consumer payments prior to dispatch or handing over of goods minimizes the risk of non-payment to the merchant and provides an increased level of confidence in transacting with new customers. Checks performed by issuers of payment cards for availability of funds do not, where identity is breached, provide further identity security. The validation process described herein provides, in addition to its triple authentication approach, additional checks against pre-registered payment preferences for consumer-preferred channels, types or values of payment, as well as volume and transaction velocity checks. These checks differ from the authentication means used, providing separation of authentication and payment.

To validate consumer payments, the merchant provides the transaction system 1 with further details of the consumer order/transaction 306. The system 1 matches the transaction details with those uploaded by the consumer and determines which consumer payment means 47 is to be used. If the consumer did not elect to upload order details (including specifying which payment means to use) prior to contacting the merchant, the payment account selected will default to the payment means nominated by the consumer during registration/maintenance. Once the payment means is identified, checks can be performed by liaising with the consumer account/service providers 2 *a-c* during transaction entry, for example to establish finds availability and status of the consumer payment account to be used 308. The transaction system 1 may facilitate these services by acting as a third party trusted processor, merchant aggregator, reseller or independent sales organization (ISO) as appropriate, in line with the appropriate payment association classifications. If the consumer issuer payment validation is successful, then a service payment validation is carried out 310.

Transactions that fail any specific issuer validation check will be notified to the consumer and a referral/service review initiated 312. Processing is halted on the consumer transaction. If the merchant is bulk processing multiple consumer orders, processing will flow to the next consumer identity transaction. Where transactions are not referred by payment issuers, additional checks are made by the transaction system 1 to compare and validate the payment against the consumer's operational parameters such as for payment type, value, transaction frequency/velocity and bulk spend in a consumer-predefined period that are stored against the consumer's account during registration or account maintenance. The transaction system 1 may compare the transaction details, along with transactions from the consumer transaction log where appropriate, with the preferences and limits stored on the consumer's account. If a transaction would result in a breach of operational parameters, the transaction is referred back to the consumer using the referred transactions procedure 314. This may include a review of the consumer's status and activity. Processing is halted on the consumer transaction. If the merchant is bulk-processing orders for multiple consumers, processing will flow to the next consumer identity transaction.

For valid transactions that are not stopped by issuer or consumer referrals, additional merchant validation checks 316 are applied by the transaction system 1, irrespective of the method utilized by the merchant for communicating with the transaction system 1. These merchant validation checks are necessary to ensure that the merchant keeps within its operational parameters, such as value, transaction volume, frequency/velocity and level of complaints, agreed and authorized during the merchant registration or subsequent merchant account review or account maintenance. Where breaches of merchant operational parameters occur, the transaction system 1 may either restrict merchant transactions or allow the merchant to fulfill the transactions processed with appropriate retention of settlement for payments until the merchant's transaction activity is brought back within the operational parameters or new operational parameters are agreed and authorized. The merchant will be referred to an operator to review 318 its service agreement, for example to negotiate different agreement limits, regardless of whether transactions are allowed or halted. Whether a transaction is halted or allowed will depend upon, respectively, whether or not shadow limits have been breached.

Where merchant processing is halted, the merchant is notified and further transacting with the merchant suspended until the merchant rectifies the reason for the breach of operational parameters, or agrees a change to, its service agreement terms and/or operational parameters 320. The merchant is then responsible for communicating the delay in processing to the relevant consumer, as the rationale for restricting transactions is linked to the merchant commercial terms with the service operator. The transaction system 1 will additionally send a notification to the consumer that transactions are halted, in accordance with consumer notification preferences. Updates to the merchant and consumer transaction logs are made, together with updates to the audit trail logs, tagged with appropriate status codes, which indicate the status of the transaction, for example "transaction halted: merchant limit breach". Every transaction has a status code until it is completed. No further activity on the consumer transaction causing the merchant breach takes place. A new transaction will require to be processed where the merchant breach of operational parameters is not rectified.

If the merchant validation checks are satisfactorily completed, acknowledgement is provided in real-time by the transaction system 1 to the merchant as appropriate 322. A unique transaction identifier is assigned to the validated transaction. Additional acknowledgement can be provided in the form of automated SMS text message, either per transaction or at end of day for consolidated transaction details. The merchant will be required to respond to an SMS message with a predefined password set at registration before the acknowledgement is transmitted. Historic merchant acknowledgements are stored on the merchant's transaction log and can be reviewed by the merchant by interaction with the transaction system 1. The consumer is also notified of the completed merchant transaction using the notification procedure.

Finally, merchant and consumer transaction histories, and relevant audit trail logs are updated. Subsequent transactions are processed until all consumer orders are processed. If the merchant is processing bulk orders for multiple consumers, processing will flow to the next consumer identity transaction. Processing of valid merchant transactions is next directed to the consumer acceptance/rejection process, which allows the consumer to confirm that they did place the original order and that they accept the dispatch of goods/services from, and payment to, the merchant. This extra check at this advanced stage in the order process provides increased end-to-end security against payment fraud and consumer and merchant identity theft. In order for fraud to occur, multiple security breaches and checks would require to be compromised.

Within the notice of the completed merchant transaction, the consumer is prompted to respond to accept or reject the merchant processed transaction by providing details of the order via the notification system, and then to confirm their choice, to ensure single-attempt transaction entry errors are minimized 324. The consumer may, alternatively, elect to trust validated order transactions, in which case a transaction acknowledgement will be sent. Specification of which transactions to trust is set during consumer registration or account maintenance. In the event of discrepancies, the consumer may contact an operator to obtain more details of the transaction.

Where the consumer elects to reject a merchant order transaction, the specific order transaction concerned will be halted and the transaction status will be changed to "consumer rejected". No further activity is taken to settle the transaction between consumer and merchant. Where the consumer accepts the payment transaction, the transaction status will be set to "awaiting fulfillment". Relevant merchant and consumer transaction and value limits will be updated for "awaiting fulfillment" transactions, to ensure that early warning is registered of potential breaches. The merchant is then notified by the transaction system 1 to proceed with order fulfillment. Thus, before the merchant can dispatch goods/services to a consumer the following security steps must be completed: Successful authentication of the merchant identity; successful authentication of the consumer identity; successful validation checks that the merchant and consumer are operating within their service preferences and limits; validation of the consumer payment means; and confirmation from the consumer that they accept the transaction as valid and wish to proceed. This combination of security measures provides a safeguard for both the merchant and consumer beyond levels provided by prior art payment systems, and can advantageously be applied over multiple transaction channels.

Once the merchant has goods ready to ship to the consumer, the shipping process can be engaged. This may occur contemporaneously with order processing and validation, or take place some time after, depending on the availability of goods and with predefined segregation of duties of merchant staff for added security. Validated order transactions will be held on the transaction system 1 with "awaiting fulfillment" status codes. Before starting the order fulfillment process, the merchant or staff member must authenticate their identity using the triple authentication process if an authentication device is used or the double authentication process without an authentication device. During account registration, merchants can elect to segregate each merchant staff member's ability to process and fulfill the same orders. This can be done by individual registration of merchant staff users, their authentication devices if applicable, their user identity cards and the functions to which they have access.

Figure 17:
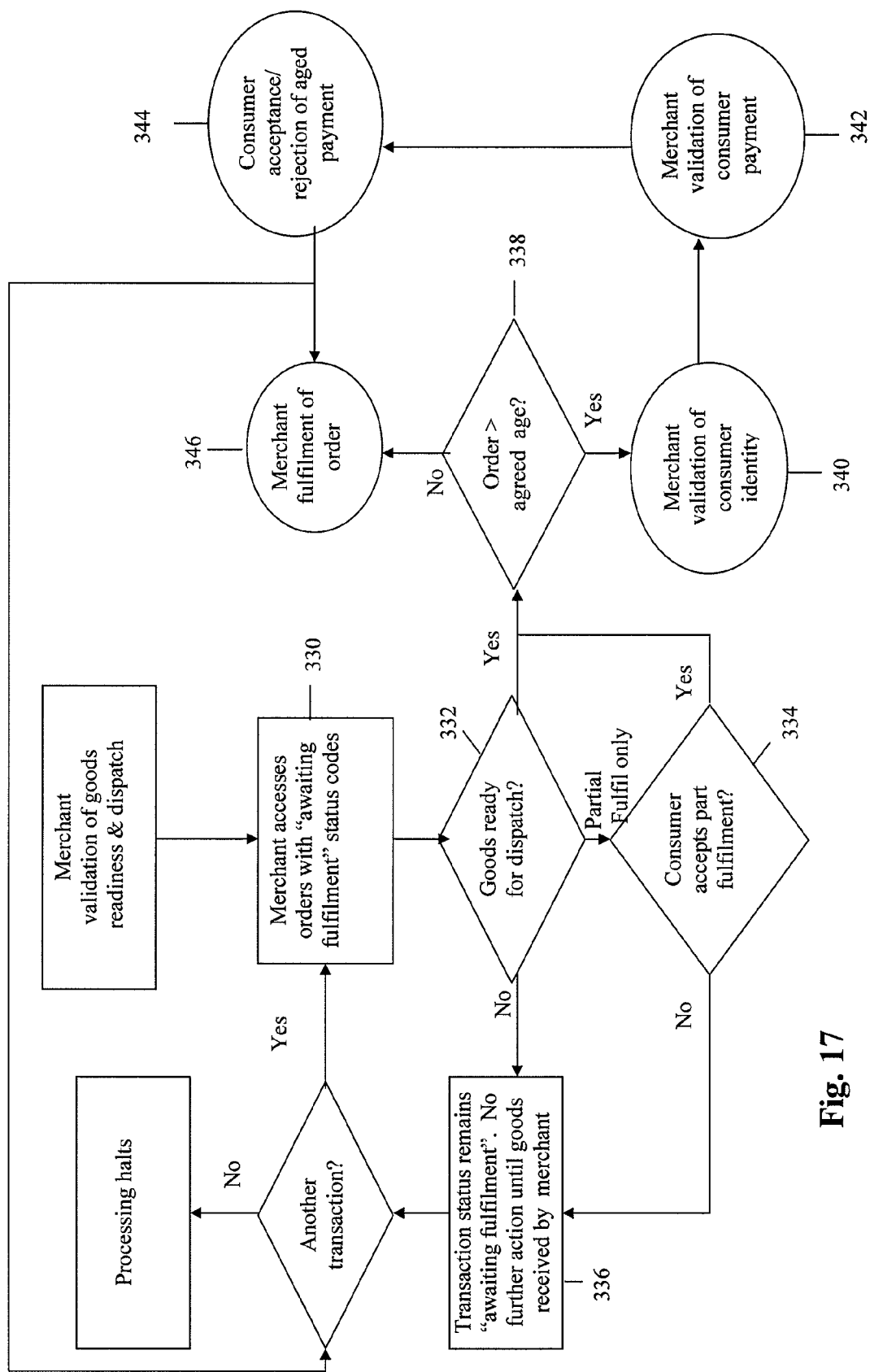
FIG. 17 is a flow diagram of a method for validating that goods are ready for dispatch.

As shown in FIG. 17, once both merchant and/or relevant merchant staff are authenticated (notwithstanding they may already be on line and not subject to predefined segregation of duties for added security), the merchant (or merchant staff) may access those order transactions flagged with a status of "awaiting fulfillment", from the transaction system 1. The merchant identifies the transaction(s) to be processed for payment by their account details and order transaction reference(s), which additionally identifies the channel of origin, for example mail, Internet, telephone. Only transactions with an "awaiting fulfillment" status are made available to the merchant by the transaction system 1. Referred transactions will be held in an appropriate queue tagged with a "referred transaction" status.

The merchant will be prompted by IVR, operator, Extranet or authentication device prompt, to acknowledge the merchant is ready to dispatch the goods concerned. This facilitates card scheme requirements to take payment only on dispatch of goods, providing an additional compliance check. The merchant then accesses the orders that are awaiting fulfillment 330 and determines whether the orders can be wholly or partially fulfilled 332. Where goods are partially available for dispatch, the merchant contacts the consumer to determine whether the consumer wishes to accept delivery of the partial order or whether they would prefer to wait 334. The request is made via the notification system. The consumer can then respond accordingly via the transaction system 1. The consumer may also default to await fulfillment of complete orders or accept partial fulfillment at registration or through account maintenance. Where (i) the merchant does not have the goods to fulfill the order; or (ii) the consumer declines partial fulfillment, or (iii) the consumer accepts partial fulfillment, for those goods that cannot be fulfilled, the transaction status of the order remains at "awaiting fulfillment" 336 and no further action is taken on that order until the goods are ready for dispatch to fulfill the consumer order. Where the merchant has one or more further transactions to process, the system 1 will direct the merchant to the next order with transaction status "awaiting fulfillment".

Once the merchant has acknowledged readiness to dispatch goods (whether full or partial orders), and the consumer order is wholly fulfilled, or partially fulfilled with consumer acceptance, a check is performed to assess whether the initial processing of the order is over a specified number of days old, defaulted to five days at registration (and specified further in the merchant service agreement) 338. Where the order has been unfulfilled for at least this period, the transaction system 1 re-validates the consumer identity 340 and payment details to ensure the payment can proceed before goods are dispatched 342. This security check ensures that merchants are not overtly exposed to fraud that may have occurred during the delay between the payment transaction and completion. The transaction system 1 firstly re-validates the consumer's identity and address code as described above, to ensure it remains active and does not have a "lost/stolen" or other security status recorded. If the consumer identity and address code are revalidated, the transaction system 1 next revalidates the relevant payment means for funds availability and notification statuses.

The consumer can select to automatically trust transactions in their operating parameters. If transactions are automatically trusted then the aged transaction status is then updated to "awaiting address confirmation" and the merchant is notified. Where a consumer has not previously elected to automatically trust a transaction, the transaction system 1 reconfirms that they want the order to be fulfilled or rejected 344. Once this is done, the merchant dispatches the goods and the order is fulfilled 346. The merchant cannot fulfill orders prior to acceptance by the consumer, as the consumer address has not been passed by the transaction system 1 to the merchant. In this way, additional security protection is provided to both consumer and merchant.

Figure 18:
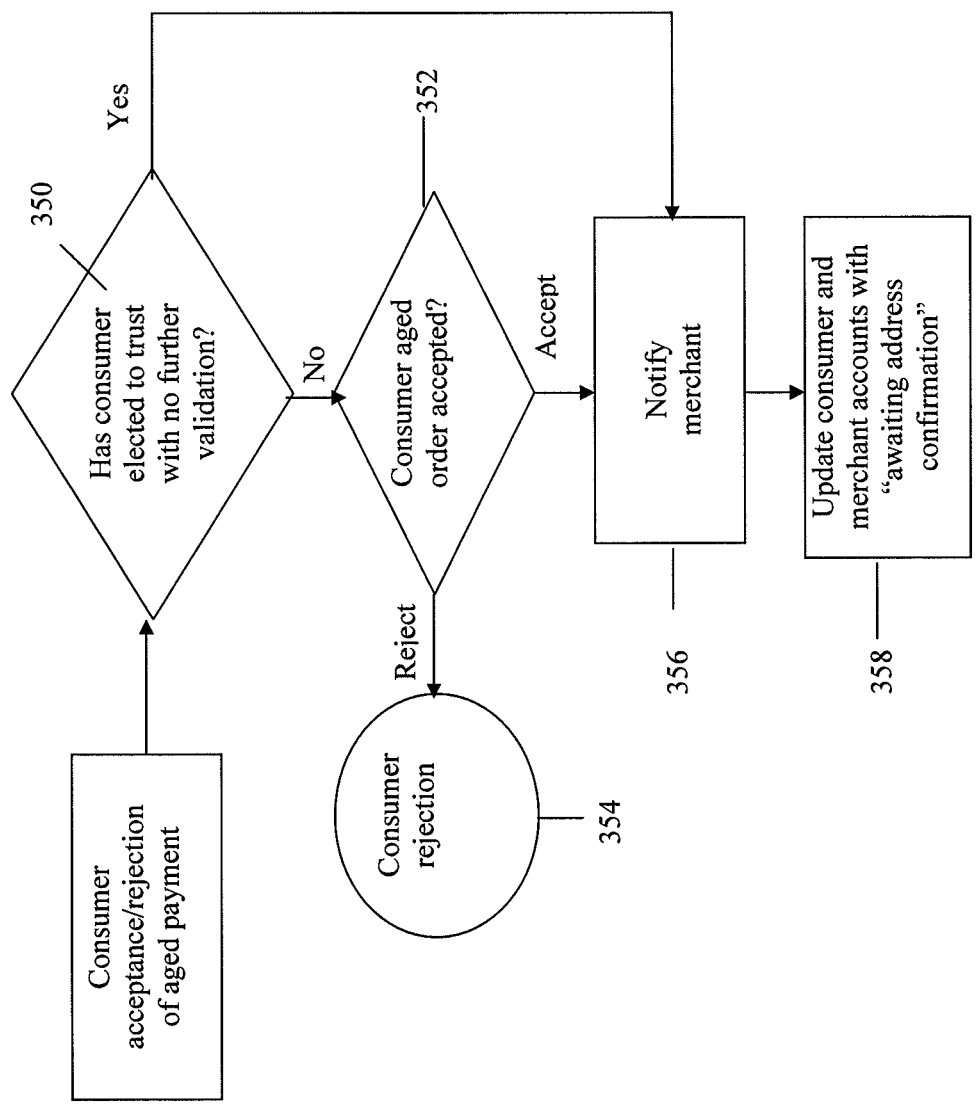
FIG. 18 is a flow diagram of a method for consumer acceptance/rejection of a payment.

FIG. 18 shows the steps for accepting and/or rejecting an aged payment in more detail. Firstly it is determined whether the consumer has elected to trust the transaction without validation 350. Where the consumer has not previously elected to trust transactions and accept fulfillment of orders processed without further validation at the order fulfillment stage, the consumer is prompted to respond to a notification requesting the user to accept or reject the delayed transaction and then to confirm his/her choice, to ensure single-attempt transaction entry errors are minimized 352. Where the consumer does not trust transactions and subsequently rejects the order 354, the merchant will receive a "consumer rejection" transaction notification from an operator, IVR, authentication device or Extranet communication. The transaction will halt and the merchant and consumer account transaction logs will be updated. No further transaction processing will take place on the rejected transaction. Audit-trail and rejected transaction records, and the merchant transaction volume and value limits will be updated. Where the consumer accepts the revalidated order, the merchant will receive acknowledgement 356 by service agent, IVR, authentication device or Extranet communication that the transaction has been successfully completed. The transaction status will be updated to "awaiting address confirmation". The transaction system 1 updates the consumer and merchant accounts for the status of the transaction (whether completed successfully or rejected) and tracks transaction stages and transaction status accordingly 358. Transactions will have a "awaiting address confirmation" or "consumer rejected" status.

Figure 19:
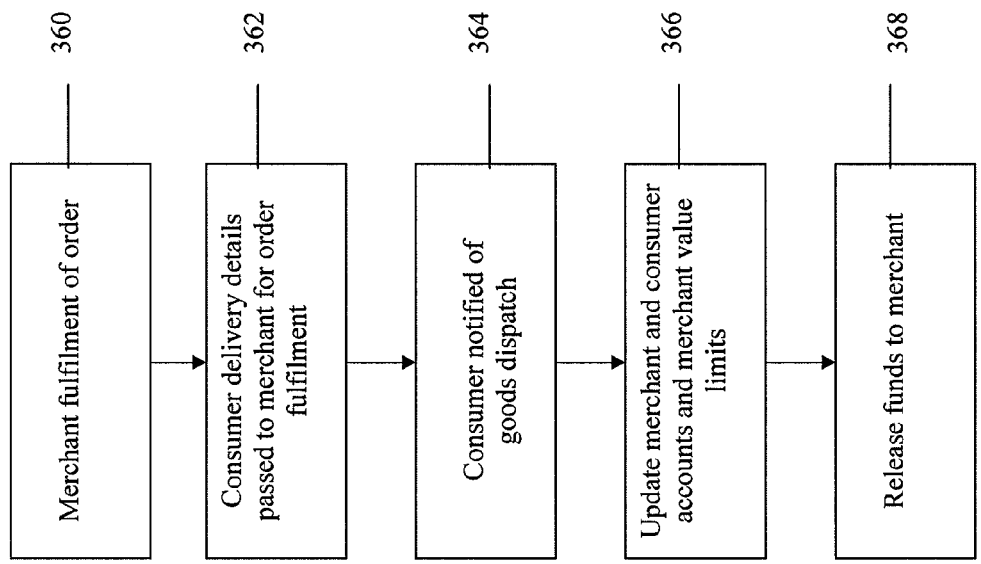
FIG. 19 is a flow diagram of a method for fulfilling an order.

Once all checks are successfully completed, the merchant can fulfill the order 360, as shown in FIG. 19. For those transactions with a status of "awaiting address confirmation" only, the consumer's delivery address details are passed to the merchant for order fulfillment 362. Thus, the consumer address is withheld from the merchant until the order is on the point of dispatch and all authentication steps have been completed. In addition, the delivery address may be different from the billing address. This is beneficial in reducing the accessibility of consumer details and thereby reducing the risk of identity theft. The consumer is notified of the dispatch of goods by a notification message 364. In this way, the consumer has a final notification of the transaction before dispatch of the goods, which allows the consumer a further chance to report any unexpected orders and thereby reducing fraud. The transaction system 1 updates the consumer and merchant accounts to "completed" transaction status. Relevant merchant transaction and value limits will be updated for completed transactions, to ensure that early warning is registered of potential breaches 366.

The transaction system 1 communicates with the issuer of the consumer payment means selected for that transaction and facilitates the transfer of funds to the merchant directly into its predefined bank account 368. In an alternate embodiment, the transaction system 1 can arrange for the transaction funds to be obtained and held in escrow by the system 1 before the goods are dispatched by the merchant. Once the funds are in escrow by the system 1, the system notifies the merchant. The merchant may then dispatch the goods, with the funds being transferred by the system 1 to the merchant's predefined bank account when the goods are received by the consumer. This gives the retailer a guarantee of payment and the consumer a guarantee that they will receive the goods before payment is received by the retailer. Any chargeback reserve or retention fund assessed prudent by the system operator or in accordance with the merchant service agreement will be withheld until the merchant meets specific contractual terms.

Figure 20:
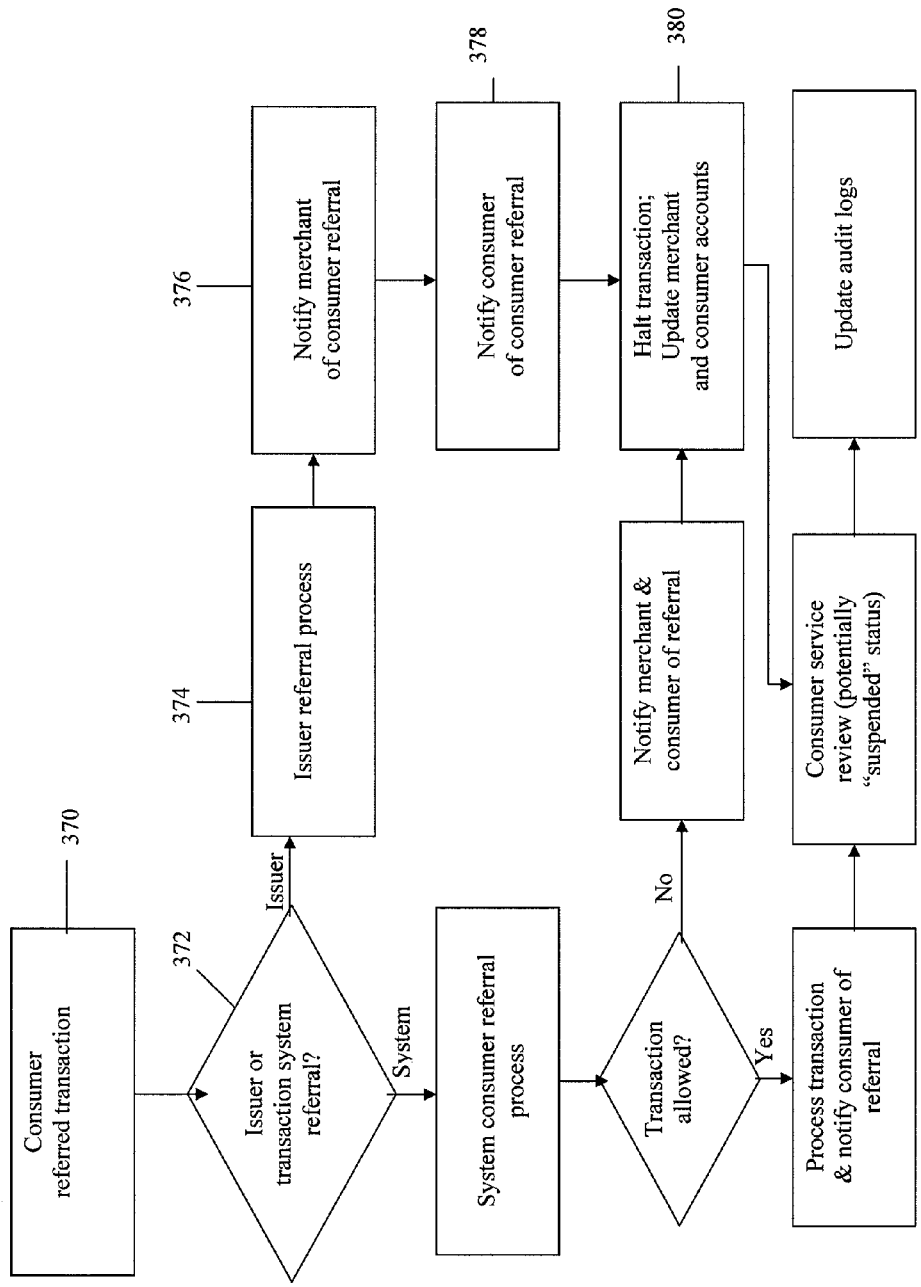
FIG. 20 is a flow diagram of a method for processing referred consumer transactions.

FIG. 20 shows the process for handling referred consumer transactions. Each user account has certain operational parameters within which the account must be operated. The operational parameters are either set by the service operator when issuing accounts or during a user review, based on an assessment of the risk of the user in order to minimize exposure of the service operator to fraud and bad debts, and/or selected by the user themselves on registration or account maintenance to limit their own exposure to fraudulent use or to help control their own transaction patterns. As shown in FIG. 18, referred transactions are transactions that fail to meet these operational parameters or are referred by a user's payment issuer is response to a breach of limits set by the issuer. Since changing of the operational parameters is via account maintenance, which requires the user to dual or triple authenticate themselves, it is considerably more difficult for fraudsters to alter user account settings and thereby reduce the possibility that fraudulent transactions can be approved. The greater the use of these criteria, the more effective the referral processes will be. Consumer security and convenience are therefore emphasized.

Consumer transactions may be referred either by the transaction system or by the institution providing the consumer with a card or account for a number of reasons. When a referral is made, it is firstly determined whether it was by the system 1 or the issuer 372. Where it is the issuer, referral can be for a number of reasons, e.g. insufficient funds, temporary hold on account, lost or stolen card, type of merchant, value of transaction. Payment card and non-card payment means transaction validation checks are performed during transaction entry, in line with existing payment provider checks, to establish funds availability and status of the registered consumer payment account being used. The transaction system 1 may facilitate these validation checks directly or through access to payment provider services by acting as a third party trusted processor, merchant aggregator, reseller or independent sales organization (ISO) as appropriate, in line with Cards and non-Cards payment association classifications. When a card or non-card payment account breaches a predefined referral check, a formal card, or non-card issuer referral is activated, in line with card scheme or non-card payment means provider regulations. In addition, consumer operational parameters may be breached that trigger a referral by the transaction system 1 that halts or delays a consumer's ability to pursue a transaction further. The operational parameters include, for example, checking for breach of limits on payment type, value, transaction frequency/velocity and bulk spend in a consumer-predefined period.

Where a consumer's payment means issuer (e.g. Visa, MasterCard) refers 374 a transaction to the transaction system 1, the transaction system 1 will notify the merchant automatically 376. The merchant will be notified of the referral status of transactions by the interaction route being used to process the consumer payment transactions, e.g. by IVR, service agent by telephone, Extranet or authentication device. The merchant will notify transaction referral to the consumer during the ordinary course of the transactions, as referrals necessarily hold up payment completion progress 378. For consumer order transactions, notification is also made using the notification system. This approach should ensure appropriate notification to the consumer is effected, alerting the consumer to any transaction issues of which they should be aware. Where a referral has occurred due to the consumer breaching one or more predefined operating parameters, the consumer is requested to contact an operator for a service review. Assessment of the referred transaction against shadow limits will determine whether a transaction can be processed to conclusion. Shadow limits will be set at registration and will be applied by the transaction system 1 to allow orderly management of consumer use of the service. This enables the consumer to have control over the value and velocity of their transactions.

Where a transaction is allowed within the shadow limits, the referred transaction is processed to conclusion. The relevant user is notified by a notification and the consumer may be requested to seek a service review. Where the transaction system 1 does not allow a transaction to proceed to conclusion, for example, where a shadow limit is breached or an issuer referral has occurred, both the merchant involved and the consumer are notified by the notification system. The payment transaction will be halted, and its status set to "halted" 380. The transaction system 1 will take no further action on the transaction until the merchant and consumer have placed a further transaction that is not referred. Additionally, the merchant and consumer transaction records will be updated to reflect the transaction status. The audit trail logs are updated with details of the transaction.

Figure 21:
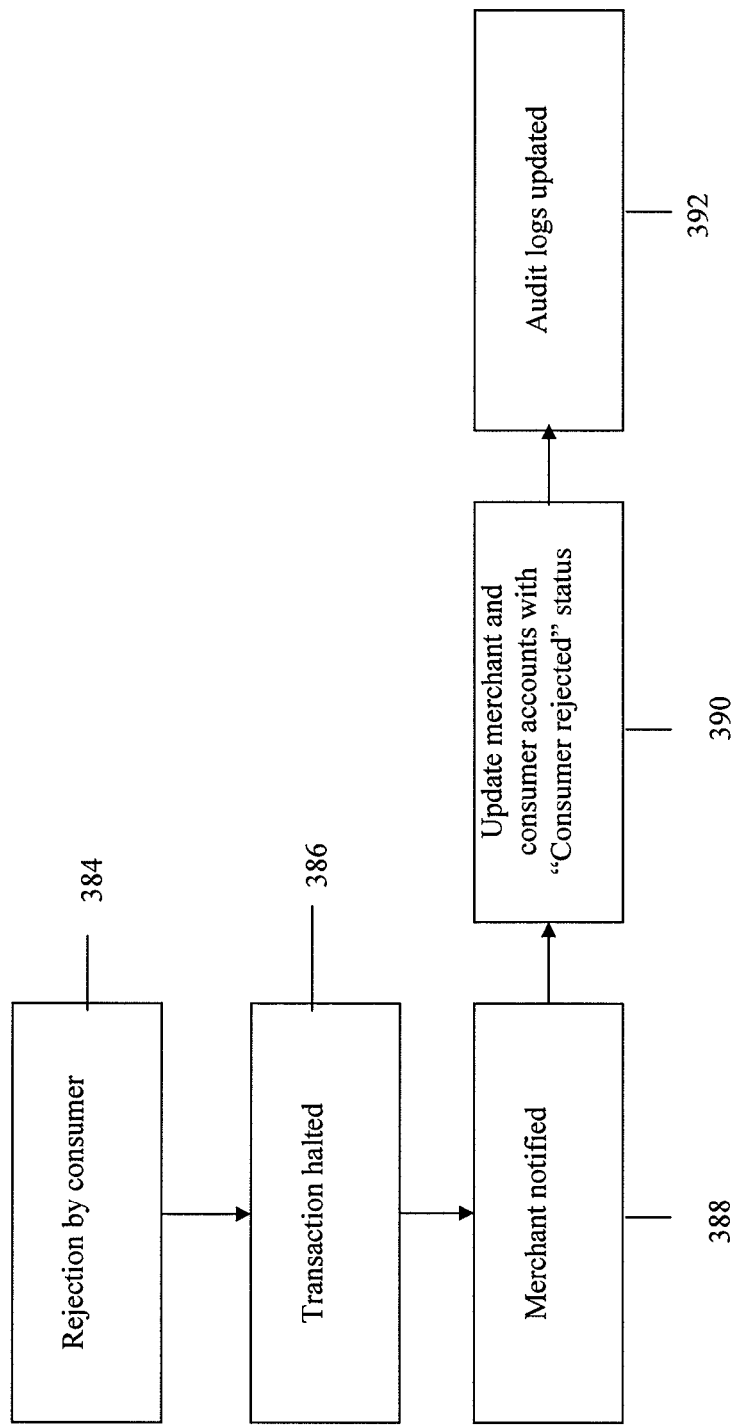
FIG. 21 is a flow diagram of a consumer rejection process.

As shown in FIG. 21, in particular instances, a consumer may reject a transaction 384. This may take place where the consumer is unaware the transaction has been made, for example fraud or misuse, but the existing card or bank account systems used by the consumer have not been alerted to the activity. It may also be due to "cooling off" legislation, which allows consumers to repudiate transactions in particular circumstances and hand back goods. Where the consumer rejects the transaction, and selects an appropriate reason code for transmission, the transaction will be halted 386. The consumer may also reject a pending transaction that has yet to be fulfilled, due to merchant delay, before the merchant acknowledges readiness to dispatch the order. The consumer will do this by processing a rejection transaction through a valid, secure authentication device, Extranet or by direct telephone call. SMS or email will not be valid formats for processing consumer initiated rejection transactions as since these transactions are consumer initiated, the options to provide authentication using these channels are limited. No further activity on the transaction will take place. No goods will at this stage have passed from the merchant to the consumer, and the status of the transaction should remain at "awaiting fulfillment". The consumer may reject the transaction even after acceptance during initial transaction validation if a valid reason code is entered. On receipt of a valid consumer rejection transaction, the merchant concerned will be notified by the notification system 388. The merchant and consumer transaction logs will be updated accordingly 390 and the audit trail logs will be updated 392. System operators can then investigate the transaction and engage transaction monitoring systems to identify whether fraudulent or abnormal activity is taking place with the consumer and merchant concerned.

Figure 22:
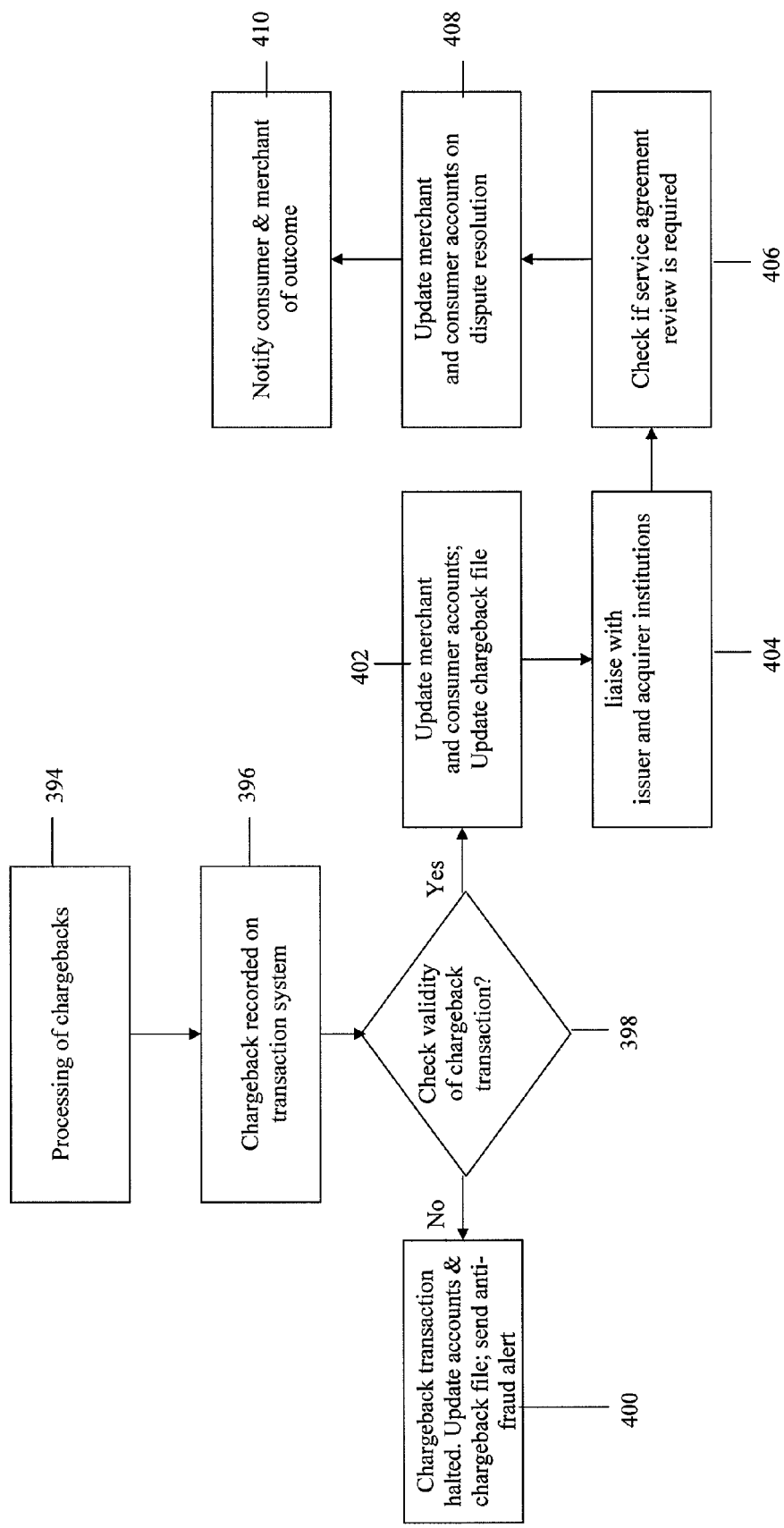
FIG. 22 is a flow diagram of a method for processing chargebacks.

In view of the unique additional security aspects offered by the transaction system 1, the probability of chargebacks due to fraudulent transactions will be significantly reduced, enhancing convenience and security for consumers, and reducing fraud risk, costs and administration for merchants. Nevertheless, provisions are made for doing this as shown in FIG. 22. Chargeback transactions originate from issuers of credit and charge card products who have been legitimately instructed by consumers who wish, for varying reasons, to reverse a payment transaction previously made, generally due to dispute. The transaction system 1 will process chargebacks 394 against registered merchants in line with credit card association rules for credit cards, for example, where a consumer claims goods purchased were not received or where the item purchased is "not as described" by the merchant. Other payment provider chargeback rules will also be honored. The authentication, notification service and other security aspects result in reduced probability of chargebacks due to fraudulent transactions, enhancing convenience and security for consumers, and reducing fraud risk, costs and administration for merchants.

A consumer requiring a chargeback to be made sends a chargeback request to the transaction system 1 directly for service transactions, or through the consumer's issuing institution for other transactions, where the system acts as a merchant aggregator or ISO. The system is checked to see whether the chargeback is recorded 396. Details of the transaction to be charged back are matched against the consumer and merchant transaction records and validated against legitimate chargeback reason codes 398. This prevents consumers mistakenly or fraudulently obtaining chargebacks on transactions that have not actually occurred or for invalid reasons. Where the chargeback request is unsupported, no further action is taken, and the consumer and merchant transaction logs and audit and chargeback logs are updated accordingly 400. The system 1 will transfer the relevant transaction details onto the audit logs to filter against future chargeback attempts involving the same consumer or merchant.

Where a chargeback request is valid, both the merchant and consumer accounts are updated with the chargeback details and reason codes in accordance with general industry practice 402. The chargeback log will also be updated. The transaction concerned will be charged back against the merchant's account or chargeback reserve as necessary whilst chargeback dispute resolution takes place. The transaction system 1 will pass details to the merchant's bank or payment institution concerned, and thereafter liaise 404 with the merchant's bank/institution and the consumer's bank/institution as necessary. For non-card transactions, the operator liaises with the banks/institutions representing the consumer and the merchant as necessary.

In instances in which resolution to a chargeback dispute is required, merchant and consumer service terms and conditions will dictate which party bears the liability for the value in dispute 406. This will be facilitated through service agreement reviews. This review may result in suspension of particular merchants or consumers from use of the service due to excessive chargeback histories, velocities or value parameters being breached. During "suspended" periods, merchants or consumers may only access registration and maintenance facilities. No payment transactions can be processed. Chargeback dispute resolution may result in merchant funds being withheld whilst a chargeback dispute is investigated to conclusion. Dispute resolution may result in a refund to the consumer from the merchant, or validation of the disputed transaction in favor of the merchant 408. The relevant consumer and merchant accounts will be updated on completion of the chargeback dispute. Dispute resolution will be communicated to the users concerned via the notification system 410.

Figure 23:
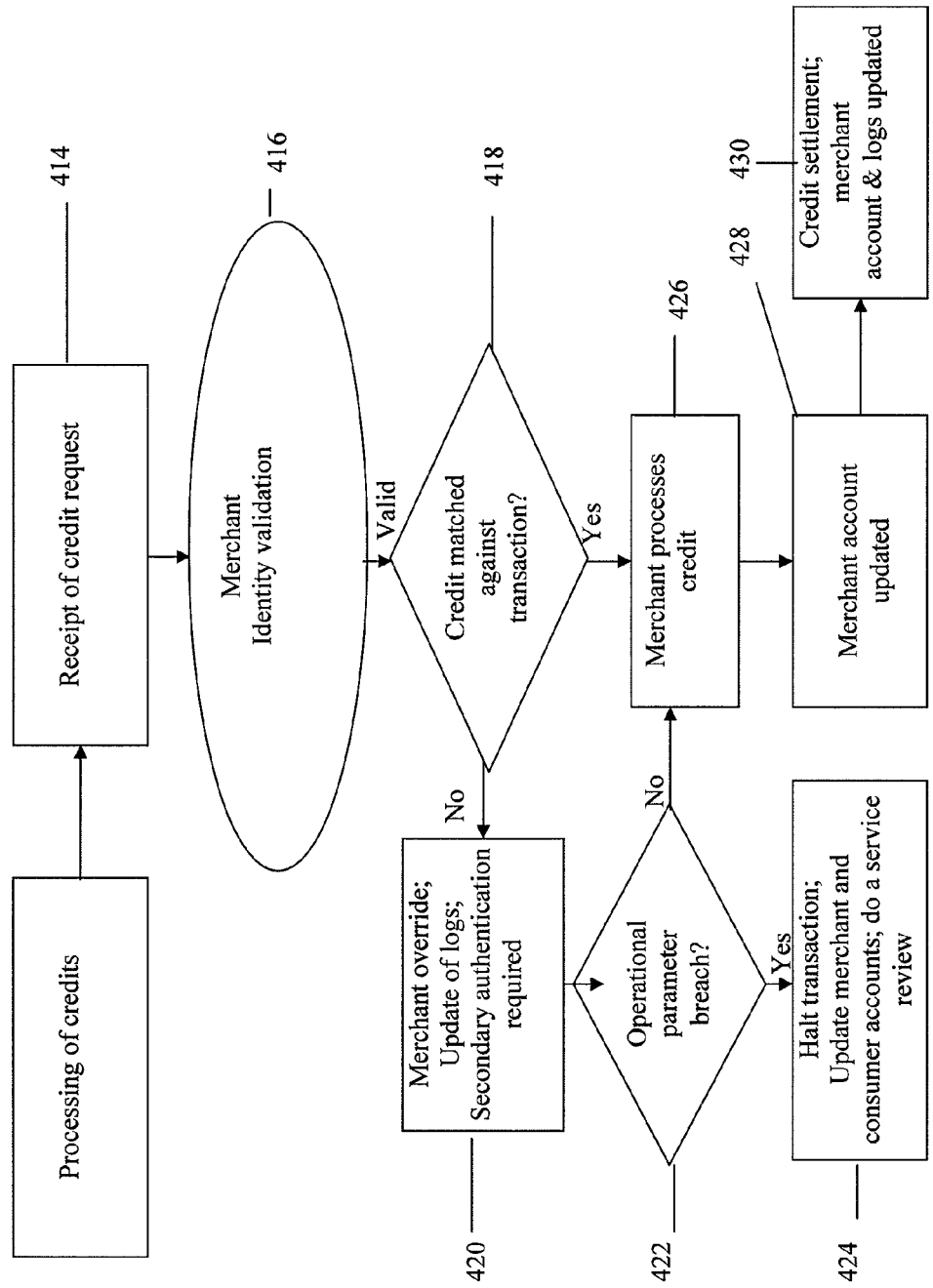
FIG. 23 is a flow diagram of a method for processing credits.

In some instances, for example, where an error is made and accepted by a merchant, e.g. processing error, or goods are legitimately returned or exchanged, a credit transaction may be required to reimburse, in full or in part, the consumer. In such cases, the merchant can process a credit using the transaction system 1. FIG. 23 shows the steps for processing credits. Credits may be issued to consumers mistakenly or fraudulently by members of the merchant's staff. In order to minimize this, the service matches credits to underlying transactions and if they are not matched, presents additional security levels to validate the credits. In addition, merchant check criteria may be set and permissions only given to certain members of merchant staff, for example to authorize large value credits, as defined on registration or account maintenance, or credits that do not match underlying transactions.

Where a credit transaction is initiated 414, the merchant may only process the credit against a completed transaction. In order to process a credit the merchant and merchant member of staff must undergo the double or triple authentication process. As described previously, merchants can elect to improve security over potential fraud by segregating the ability to process order transactions and subsequent credit transactions against those orders amongst different merchant staff by registering different merchant staff as users, their authentication devices if applicable and their identity cards and assigning their access only to certain transaction system 1 functions. Once the merchant staff member identity details are validated 416, details of the transaction to be credited back are matched against the consumer and merchant account records 418.

Where the credit cannot be matched partially or fully against a previously completed transaction, no further action is taken unless the merchant further authorizes the credit 420. This further authorization may be done where merchants possess two or more identity cards, the merchant will be required to have a secondary authorization for processing of credits in excess of a value set up on merchant registration or where matching does not occur. This uniquely provides security against fraudulent processing of credits by individual members of merchant staff colluding with third party consumers (who may be themselves). Parameters such as specific value and velocity and volume of credit transactions are specified in the merchant's operating parameters upon registration or account maintenance and will be monitored against both merchant and consumer accounts, and the audit trail and anti-fraud logs updated, providing a unique monitoring check against multiple merchant-consumer combinations 422.

Where a merchant has two or more identity cards, the merchant may elect during registration or account maintenance to have a secondary authorization for processing of credits where a predefined credit limit is breached (for single or multiple transactions across specific and general time periods). Where a particular merchant and/or consumer has breached its operating parameters across particular timescales of credit transactions, the user service agreement terms may restrict further processing of credits. Where a credit transaction breaches the operating parameters, the transaction is halted, the merchant and consumer accounts are updated, and relevant audit trail logs are updated 424. A service review is then instigated to investigate matters further.

Where a credit transaction is matched, or is further authorized and does not breach any operating parameters, the credit processing proceeds 426. Merchant settlement proceeds may be withheld to set-off/cover credit transactions for a specified period thereby providing protection against increasing, undetected fraud by otherwise authorized members of merchant staff. Once processed, the consumer and merchant transaction accounts are updated accordingly 428 and a notification sent to the consumer by the notification process. Funds are settled back to the consumer from the merchant account in accordance with the user service agreement. Consumer and merchant accounts will be updated, and credit transaction and audit log files updated 430. The status of the credit transaction is set to "completed." The credit transaction log is monitored for velocity, volume and value checks against merchant and consumer accounts, to facilitate anti-fraud checks.

As noted previously the present invention can be used for many different transaction types. The same basic principles apply to all of these. However, as will be appreciated, the specifics will vary. For example, for face-to-face transactions where the consumer will take the goods away with them, once both parties are authenticated, the transaction can be concluded as normal, although without the consumer's financial details being made available to the merchant. Hence, for face-to-face transactions there is generally no need to check whether the goods have been dispatched etc. In contrast, these considerations are clearly important for all orders for which the consumer will be unable to access or take goods physically away at the time of transaction, for example for Internet or telephone or mail order transactions. In this case, the consumer's identity code and address code are needed to help identify where goods are to be sent when dispatched. Only where prior order lodgement and merchant validation has been recorded will details of the order be stored within the consumer's and/or merchant's user accounts on the transaction system 1.

A skilled person will appreciate that variations of the disclosed arrangements are possible without departing from the invention. For example, although the transaction server, authentication server, payment server and any server required by the communications system are shown as physically separate, or one or more of the transaction system 1 server functions may be incorporated within the same physical server. In addition, whilst the description refers generally to the use of servers, it will be appreciated that any computer processor or computer based system could be used. Accordingly the above description of the specific embodiment is made by way of example only and not for the purposes of limitation. It is clear that minor modifications may be made without significant changes to the operation described.

The invention claimed is:

1. A combined identity protection and secure transaction routing system for facilitating a financial transaction between a first user and a second user comprising:

a computer based authentication system for authenticating at least the first user, the authentication system being configured to implement a plurality of established and user-defined authentication methods that are dynamically controllable and selectable by the first user at various transaction stages of the financial transaction and conform to standards set by relevant payment organisation's rules, wherein upon the first user dynamically selecting one or more particular authentication methods from the plurality of established and user-defined authentication methods during a particular transaction stage, the authentication system is configured to combine the one or more selected authentication methods, and one or more interaction methods, and one or more communication media to become user-specific dynamic authentication components so as to authenticate at least the first user in a non-predictable manner;

one or more computer, electronic or physically based payment encryption and transaction routing systems, dynamically selectable and arrangable by the first user in combination with the first user's independent dynamically selected authentication methods, for arranging and securely routing one or more particular payment methods during the financial transaction or a particular transaction stage between the first user and at least the second user after the first user is authenticated by the authentication system, wherein upon the first user selecting the one or more particular payment methods during the financial transaction or the particular transaction stage, the one or more particular payment methods are routed between the first user and at least the second user in a non-predictable manner and without disclosing the one or more payment methods used for the financial transaction or the particular transaction stage or the first user's financial details and personal identity to the second user; and the one or more communication media and the one or more interaction methods, dynamically controllable and selectable by the first user, wherein upon the first user selecting one or more of at least the one or more communication media or the one or more interactions methods during the financial transaction or at a particular transaction stage, each decomposed transaction element of the financial transaction or the particular transaction stage is routed and transmitted in a non-predictable manner.

2. A combined identity protection and secure transaction routing system according to claim 1 that is adapted to process a transaction that is or includes payment for goods or services.

3. A combined identity protection and secure transaction routing system according to claim 1, in which payment methods are functionally or physically separate from the authentication methods.

4. A combined identity protection and secure transaction routing system according to claim 1 that is adapted to apply the same authentication methods to all users that are party to a transaction.

5. A combined identity protection and secure transaction routing system according to claim 1 that is adapted to receive transaction details from at least the first and second users; compare the received transaction details to ensure that they are identical and arrange payment only if the transaction details match.

6. A combined identity protection and secure transaction routing system according to claim 1 that is adapted to arrange payment directly from at least one of the first user's account, such as a credit or debit card account or any other financial payment method provided to allow the user to make payments.

7. A combined identity protection and secure transaction routing system according to claim 1 that is adapted to receive payment and hold it in escrow until goods are dispatched or services provided or the first user acknowledges the payment is valid.

8. A combined identity protection and secure transaction routing system according to claim 1 wherein the transaction is a cash withdrawal or cash advance.

9. A combined identity protection and secure transaction routing system according to claim 1 that is adapted to be used with transactions over one or multiple transaction channels.

10. A combined identity protection and secure transaction routing system according to claim 9, wherein the transaction channels include face-to-face or mail order or telephone order or Internet shopping or user-to-user transfers or purchase by mobile phone or other contactless purchase methods.

11. A combined identity protection and secure transaction routing system according to claim 1 including a communications system for allowing at least one of the first or second user to interact with the system via the Internet or another network using an IP protocol or telephone or mobile data communications services.

12. A combined identity protection and secure transaction routing system according to claim 1 that is adapted to apply the same authentication regardless of transaction channel, so that a consistent level of security is applied in all transactions.

13. A combined identity protection and secure transaction routing system according to claim 1, wherein the transaction system is adapted to apply differing authentication to differing transaction channels.

14. A combined identity protection and secure transaction routing system according to claim 1 that is adapted to receive data from a transaction device.

15. A combined identity protection and secure transaction routing system according to claim 1 that is adapted to apply at least two authentication stages.

16. A combined identity protection and secure transaction routing system according to claim 15, wherein each authentication stage requires at least one of: (1) input of personal identification numbers or code words or personal details or answers to challenge questions or biometric data or matching of a user with a list of authorized users for a transaction device or valid reading of an EMV compliant card or other registered identity card or cross referencing two or more sets of provided authentication data; or (2) selection of one or more communication media and one or more interaction methods.

17. A combined identity protection and secure transaction routing system according to claim 1 that is adapted to apply at least three authentication stages.

18. A combined identity protection and secure transaction routing system according to claim 1, wherein authentication involves comparing the input data with user related data stored by the system.

19. A combined identity protection and secure transaction routing system according to claim 1, wherein authentication involves online or offline authentication stages.

20. A combined identity protection and secure transaction routing system according to claim 1 that is adapted to store user names or user identification codes or user addresses or user address codes or user payment account details or user operating parameters or user transaction histories or audit trails.

21. A combined identity protection and secure transaction routing system according to claim 1 that is adapted to process orders using a user identification code and a delivery address code uniquely associated with at least the first user.

22. A combined identity protection and secure transaction routing system according to claim 21 that is adapted to receive the delivery address code of at least the first user, determine an address corresponding to the delivery address code and to provide the address to the second user only when the second user has been authenticated and has confirmed that it is in a position to fulfill the financial transaction.

23. A combined identity protection and secure transaction routing system according to claim 1 that is adapted to have more than one payment method associated with at least one of the first or second user.

24. A combined identity protection and secure transaction routing system according to claim 23 that is adapted such that at least one of the payment methods is assignable for use in specified transactions.

25. A combined identity protection and secure transaction routing system according to claim 1 that is adapted to use a payment method to carry out a payment after authenticating at least one of the first or second user and when provided with an identification code of at least one of the first or second user rather than details of the payment method to be used.

26. A combined identity protection and secure transaction routing system according to claim 1 that is adapted to send a notification to at least one of the first or second user to confirm events.

27. A combined identity protection and secure transaction routing system according to claim 26, wherein the events of which the at least one of the first or second user is notified include authentication failures or mismatch of order details supplied by the first and second users or an order is available for dispatch or an order is only partially fulfilled or a payment is to be made or a payment is refused or the financial transaction has been referred or at least one of the first or second user has, or is close to, breach of their operating parameters.

28. A combined identity protection and secure transaction routing system according to claim 26, wherein the notification is a short message service (SMS) message or e-mail or telephone call or message sent to a transaction device.

29. A combined identity protection and secure transaction routing system according to claim 26, wherein the notification is via a different communication media to the placing of an order.

30. A combined identity protection and secure transaction routing system according to claim 26 that is adapted to obtain authentication of at least one of the first or second user before providing access to the notification.

31. A combined identity protection and secure transaction routing system according to claim 1 that is adapted to assign at least one identity code to at least the first user, whereby the authentication methods are adapted to validate an identity or status of the first user to the second user upon provision of the first user's identity code to the system by the second user.

32. A combined identity protection and secure transaction routing system according to claim 1 that is adapted to validate whether or not at least one of the first or second user is a registered user of the system or the at least one of the first or second user is transacting within specified criteria or a user account has permission for carrying out the financial transaction.

33. A combined identity protection and secure transaction routing system according to claim 32, wherein the specified criteria include that transactions values or transaction velocities are within a set limit or that the transaction is of a specified type.

34. A combined identity protection and secure transaction routing system according to claim 1 that is adapted to allow at least one sub user to operate on behalf of at least one of the first or second user.

35. A combined identity protection and secure transaction routing system according to claim 1 that is adapted to require re-authentication by at least one of the first or second user if the financial transaction has not been completed within a specified time-scale or require at least one of the first or second user to review or accept the financial transaction if the financial transaction has not been completed within a specified time-scale.

36. A combined identity protection and secure transaction routing system according to claim 1 that is adapted to allow at least one of the first or second user to make or receive payments in a currency of choice and convert the currency of the payments such that the currency in which the payments are made is different to the currency in which the payments are received.

37. A combined identity protection and secure transaction routing system according to claim 1, wherein the computer based authentication system is arranged to communicate with the first user to receive first authentication data, communicate with the second user to receive second authentication data and authenticate the first and second users using the respective first and second authentication data.

38. A combined identity protection and secure transaction routing system according to claim 1, wherein the computer based authentication system is arranged to receive authentication data over a plurality of communications channels.

39. A combined identity protection and secure transaction routing system according to claim 1, wherein the computer based authentication system is adapted to authenticate the identity of at least the first and second user.

40. A combined identity protection and secure transaction routing system according to claim 1, wherein the first user dynamically selects and arranges the one or more payment methods during the financial transaction or a particular transaction stage in combination with but independent of the selected one or more authentication methods, and the first user dynamically selects a particular combination of the one or more communication media during the financial transaction or the particular transaction stage independent of the selected one or more authentication methods and the selected one or more payment methods.

41. An authentication and secure transaction device for use, in single or multiple component transaction parts, as part of a multi-device, multi-input method, multi-communication media, multi-interaction method, user-controlled and defined configuration, with a secure transaction routing system, comprising:

a processor that is configured to:

allow at least one of a first or second user to register centrally, or maintain locally, a plurality of user configured, dynamic, independent authentication methods that are dynamically controllable and selectable by the first user or the second user at various transaction stages of a financial transaction being conducted between the first user and at least the second user and to select the authentication methods at the various transaction stages of the financial transaction to be used to authenticate at least one of the first or second user in a non-predictable manner; and authenticate at least a first user's identity or status as a precursor to facilitating the financial transaction or particular transaction stage with at least the second user and in an event that at least the first user is authenticated, arranging for the financial transaction or the particular transaction stage to be completed using, under user or centrally-directed dynamic selection, a predefined or user-selected combination of independent, decoupled payment methods during the financial transaction or the particular transaction stage, in a non-predictable manner, the payment methods comprising at least one payment authentication method for further identity authentication related to the specific transaction, followed by a predefined or user-selected payment method, secured at least in accordance with payment organization rules associated with that payment method or combination of payment methods, without revealing the payment methods, the first user's financial details, or other personal identity details to the second user, wherein:

as appropriate under valid transaction combinations, the authentication and secure transaction device is associated with the first user and operable to communicate with the secure transaction routing system in order to authenticate the first user using one or more communication media and one or more interaction methods selected by the first user during the financial transaction or at a particular transaction stage so that each decomposed transaction element of the financial transaction or the particular transaction stage is routed and transmitted in a non-predictable manner.

42. An authentication and secure transaction device according to claim 41 comprising means for inputting data and means for communicating data to the secure transaction routing system.

43. An authentication and secure transaction device according to claim 42, wherein the means for inputting data is a keypad or a trackball or a joystick or a biometric feature reader or a reader.

44. An authentication and secure transaction device according to claim 43, wherein the biometric feature reader includes a fingerprint reader or a retinal scanner or a voice analyzer.

45. An authentication and secure transaction device according to any of claim 43, wherein the reader is a chip card reader or a magnetic strip card reader or a radio frequency identification (RFID) card reader.

46. An authentication and secure transaction device according to claim 42, wherein the means for communicating data includes wireless or mobile telecommunications apparatus or bluetooth communications apparatus or WiFi communications apparatus, such as WiFi 802.11a/b/g communications apparatus or infrared communications apparatus or RFID communications apparatus or NFC communications apparatus or a USB port or a firewire port.

47. An authentication and secure transaction device according to claim 46 wherein the mobile telecommunications apparatus is adapted to operate over GPRS or 3G or GSM or CDMA networks.

48. An authentication and secure transaction device according to claim 41 that is adapted to implement at least two authentication stages.

49. An authentication and secure transaction device according to claim 41, wherein the transaction device is adapted to apply at least three authentication stages.

50. An authentication and secure transaction device according to claim 49, wherein each authentication stage requires input of personal identification numbers or code words or personal details or answers to challenge questions or biometric data or matching of a user with a list of authorized users for the transaction device or valid reading of an EMV compliant card or other registered identity card or cross referencing two or more sets of provided authentication data.

51. An authentication and secure transaction device according to claim 41 that is configured to apply online or offline authentication stages.

52. An authentication and secure transaction device according to claim 41, wherein the transaction device is arranged to communicate authentication data to the transaction routing system over a plurality of communications channels.

53. A computer implemented method for allowing a secure financial transaction to be carried out between a first user and a second user, the method involving:
registering centrally or maintaining locally or through access to a plurality of independent, secure third parties, user-selected, dynamic, independent authentication methods that are dynamically controllable and selectable by the first user or the second user at various transaction stages of the financial transaction;
receiving a dynamic selection of one or more of the authentication methods used to authenticate the first user or accepting one or more of the authentication methods mandated by the relevant payment organization's rules so as to authenticate at least the first user in a non-predictable manner;
authenticating at least a first user's identity or status using a computer based authentication as a precursor to facilitating the financial transaction or a particular transaction stage with at least the second user; and
in an event that at least the first user is authenticated, arranging for the financial transaction or the particular transaction stage to be completed using, under user dynamic selection, a predefined or user-selected combination of independent, decoupled payment methods during the financial transaction or the particular transaction stage, in a non-predictable manner, the payment methods comprising at least one computer based payment authentication method for further identity authentication related to each specific transaction, followed by a predefined or user-selected payment method, secured at least in accordance with rules associated with that payment method, without revealing the payment methods, the first user's financial details, or other personal details to the second user; wherein
authentication data and transaction data are communicated over different communications channels, the communications channels being selected by the first user during the financial transaction or at a particular transaction stage so that the authentication data and transaction data are routed and transmitted in a non-predictable manner.

54. A method according to claim 53, wherein authenticating the first user involves receiving authentication data input by the first user via at least one communications channel.

55. A method according to claim 53, wherein the communications channel is a wireless telecommunications network or the Internet or e-mail or any other suitable communications channel.

56. A method according to claim 54, wherein different communications channels are selectable for different transaction types.

57. A method according to claim 54 comprising sending communications to the first user via a wireless telecommunications network or the Internet or e-mail.

58. A method according to claim 54 comprising sending communications to the first user via a different channel to those from the first user.

59. A method according to claim 53, including notifying at least one of the first or second user of events, including at least one of authentication failures or mismatch of order details supplied by the first and second users or an order is available for dispatch or an order is only partially fulfilled or a payment is refused or the financial transaction has been referred or at least one of the first or second user has, or is close to, breach of their operating parameters.

60. A method according to claim 59, wherein the least one of the first or second user being notified may have to be authenticated before access is given to the notification.

61. A method according to claim 53, wherein the authentication involves two-stage authentication.

62. A method according to claim 53, wherein the authentication involves at least three-stage authentication.

63. A method according to claim 61, wherein each authentication stage involves input of personal identification numbers or code words or personal details or answers to challenge questions or matching of at least one of the first or the second user with a list of authorized users for a transaction device or cross referencing two or more sets of input authentication data.

64. A method according to claim 53, wherein authentication involves comparing the input data with user related data stored by the system.

65. A method according to claim 53, wherein authentication involves online or offline authentication stages.

66. A method according to claim 53, wherein the service allows at least one of the first or second user to register one or more payment methods.

67. A method according to claim 53, wherein a particular payment method is assignable for use in specified transactions.

68. A method according to claim 67, wherein at least one of the first or second user may specify that a particular payment method may be used for transactions only with a particular organization.

69. A method according to claim 53, wherein a payment is made when the first user's authentication/identification code is provided rather than details of the payment method to be used.

70. A method according to claim 53, wherein at least one of the first user's payment methods may be used in the step of authenticating the first user.

71. A method according to claim 70, wherein the payment method used for authentication is different from the payment method used to complete the financial transaction.

72. A method according to claim 53, wherein the financial transaction is a purchase or a cash withdrawal or money transfer.

73. A method according to claim 53 involving defining operating parameters for at least one of the first or second user and checking that the financial transaction does not breach those operating parameters before making payment.

74. A method according to claim 53, wherein the service further involves allocating a user identification code to at least the first user, the first user providing the first user's identification code to at least the second user, the service authenticating the second user, the second user providing the first user's identification code to the service and the service comparing the first user's identification code with data stored in user records to confirm that the first user is a registered user of the system.

75. A method according to claim 53, wherein payment is held in escrow until goods have been dispatched.

76. A method according to claim 53, wherein a same level of authentication is applied to the first and second users.

77. A method according to claim 53, comprising communicating with the first user to receive first authentication data, communicating with the second user to receive second authentication data and authenticating the first and second users using the respective first and second authentication data.

78. A method according to claim 53, comprising communicating authentication data over a plurality of communications channels.

79. A method according to claim 53, comprising authenticating the identity of at least the first and second user.

80. A computer-executable program tangibly embodied on a non-transitory computer readable medium for:
  implementing at least one of the features of a combined identity protection and secure transaction system for facilitating a financial transaction between a first user and a second user, the system comprising:
  a computer based authentication system for authenticating at least the first user, the authentication system configured to implement a plurality of established and user-defined authentication methods that are dynamically controllable and selectable by the first user at various transaction stages of the financial transaction or mandated by a relevant payment organization's rules, wherein upon the first user dynamically selecting one or more particular authentication methods from the plurality of established and user-defined authentication methods or acceptance of one or more of the authentication methods mandated by the relevant payment organization's rules during a particular transaction stage, the authentication system is configured to combine the one or more selected authentication methods, one or more interaction methods, and one or more communication media to become user-specific dynamic authentication components so as to authenticate at least the first user in a non-predictable manner;
  one or more computer, electronic or physically based payment encryption and transaction routing systems, dynamically selectable and arrangable by the first user in combination with the first user's independent dynamically selected authentication methods, for arranging and securely routing one or more particular payment methods during the financial transaction or a particular transaction stage between the first user and at least the second user after the first user is authenticated by the authentication system, wherein upon the first user selecting the one or more particular payment methods during the financial transaction or the particular transaction stage, the one or more particular payment methods are routed between the first user and at least the second user in a non-predictable manner and without disclosing the one or more payment methods used for the financial transaction or the particular transaction stage or the first user's financial details and personal identity to the second user; and
  the one or more communication media and the one or more interaction methods, dynamically controllable and selectable by the first user, wherein upon the first user selecting one or more of at least the one or more communication media or the one or more interactions methods during the financial transaction or at a particular transaction stage, each decomposed transaction element of the financial transaction or the particular transaction stage is routed and transmitted in a non-predictable manner.

81. A computer-executable program tangibly embodied on a non-transitory computer readable medium for implementing at least one of the features of an authentication and secure transaction device for use, in single or multiple component transaction parts, as part of a multi-device, multi-input, multi-communication media, multi-interaction method, user-controlled and defined configuration, with a secure transaction routing system that is configured to:
  allow at least one of a first or second user to register centrally, or maintain locally, a plurality of user configured, dynamic, independent authentication methods that are dynamically controllable and selectable by the first user or the second user at various transaction stages of a financial transaction being conducted between the first user and at least the second user and to select the authentication methods at the various transaction stages of the financial transaction to be used to authenticate at least one of the first or second user in a non-predictable manner; and
  authenticate at least a first user's identity or status as a precursor to facilitating the financial transaction or a particular transaction stage with at least the second user and in an event that at least the first user is authenticated, arranging for the financial transaction or the particular transaction stage to be completed using, under user or centrally-directed dynamic selection, a predefined or user-selected combination of independent, decoupled payment methods during the financial transaction or the particular transaction stage, in a non-predictable manner, the payment methods comprising at least one payment authentication method for further identity authentication related to the specific transaction, followed by a predefined or user-selected payment method, secured at least in accordance with payment organization rules associated with that payment method or combination of payment methods, without revealing the payment methods, the first user's financial details, or other personal identity details to the second user, wherein as appropriate under valid transaction combinations, the authentication and secure transaction device is associated with the first user and operable to communicate with the transaction routing system in order to authenticate the first user using one or more communication media and one or more interaction methods selected by the first user during the financial transaction or at a particular transaction stage so that each decomposed transaction element of the financial transaction or the particular transaction stage is routed and transmitted in a non-predictable manner.

82. A server when programmed with a computer-executable program for:

implementing at least one of the features of a combined identity protection and secure transaction routing system for facilitating a financial transaction between a first user and a second user, the system comprising:

a computer based authentication system for authenticating at least the first user, the authentication system configured to implement a plurality of established and user-defined authentication methods that are dynamically controllable and selectable by the first user at various transaction stages of the financial transaction or mandated by a relevant payment organisation's rules, wherein upon the first user dynamically selecting one or more particular authentication methods from the plurality of established and user-defined authentication methods or acceptance of one or more of the authentication methods mandated by the relevant payment organisation's rules during a particular transaction stage, the authentication system is configured to combine the one or more selected authentication methods, one or more interaction methods, and one or more communication media to become user-specific dynamic authentication components so as to authenticate at least the first user in a non-predictable manner;

one or more computer, electronic or physically based payment encryption and transaction routing systems, dynamically selectable and arrangable by the first user in combination with the first user's independent dynamically selected authentication methods, for arranging and securely routing one or more particular payment methods during the financial transaction or a particular transaction stage between the first user and at least the second user after the first user is authenticated by the authentication system, wherein upon the first user selecting the one or more particular payment methods during the financial transaction or the particular transaction stage, the one or more particular payment methods are routed between the first user and at least the second user in a non-predictable manner and without disclosing the one or more payment methods used for the financial transaction or the particular transaction stage or the first user's financial details and personal identity to the second user; and the one or more communication media and the one or more interaction methods, dynamically controllable and selectable by the first user, wherein upon the first user selecting one or more of at least the one or more communication media or the one or more interactions methods during the financial transaction or at a particular transaction stage, each decomposed transaction element of the financial transaction or the particular transaction stage is routed and transmitted in a non-predictable manner.

83. A server when programmed with a computer-executable program for implementing at least one of the features of an authentication and secure transaction device for use, in single or multiple component transaction parts, as part of a multi-device, multi-input, multi-communication media, multi-interaction method, user-controlled and defined configuration, with a secure transaction routing system that is configured to:

allow at least one of a first or second user to register centrally, or maintain locally, a plurality of user configured, dynamic, independent authentication methods that are dynamically controllable and selectable by the first user or the second user at various transaction stages of a financial transaction being conducted between the first user and at least the second user and to select the authentication methods at the various transaction stages of the financial transaction to be used to authenticate at least one of the first or second user in a non-predictable manner; and authenticate at least a first user's identity or status as a precursor to facilitating the financial transaction or a particular transaction stage with at least the second user and in an event that at least the first user is authenticated, arranging for the financial transaction or the particular transaction stage to be completed using, under user or centrally-directed dynamic selection, a predefined or user-selected combination of independent, decoupled payment methods during the financial transaction or the particular transaction stage, in a non-predictable manner, the payment methods comprising at least one payment authentication method for further identity authentication related to the specific transaction, followed by a predefined or user-selected payment method, secured at least in accordance with payment organisation rules associated with that payment method or combination of payment methods, without revealing the payment methods, the first user's financial details, or other personal identity details to the second user, wherein as appropriate under valid transaction combinations, the authentication and secure transaction device is associated with the first user and operable to communicate with the transaction routing system in order to authenticate the first user using one or more communication media and one or more interaction methods selected by the first user during the financial transaction or at a particular transaction stage so that each decomposed transaction element of the financial transaction or the particular transaction stage is routed and transmitted in a non-predictable manner.

* * * * *

UNITED STATES PATENT AND TRADEMARK OFFICE
CERTIFICATE OF CORRECTION

| | | |
|---|---|---|
| PATENT NO. | : 8,423,466 B2 | Page 1 of 1 |
| APPLICATION NO. | : 11/692656 | |
| DATED | : April 16, 2013 | |
| INVENTOR(S) | : David Lanc | |

It is certified that error appears in the above-identified patent and that said Letters Patent is hereby corrected as shown below:

In the Specification:

Column 27, line 50, delete the word "finds" and insert therefor --funds--;

In the Claim:

Claim 41, column 40, line 28, delete the words "that is".

Signed and Sealed this
Twelfth Day of August, 2014

Michelle K. Lee
*Deputy Director of the United States Patent and Trademark Office*